US009501176B1

(12) United States Patent
Smits

(10) Patent No.: US 9,501,176 B1
(45) Date of Patent: Nov. 22, 2016

(54) METHOD, APPARATUS, AND MANUFACTURE FOR DOCUMENT WRITING AND ANNOTATION WITH VIRTUAL INK

(71) Applicant: Gerard Dirk Smits, Los Gatos, CA (US)

(72) Inventor: Gerard Dirk Smits, Los Gatos, CA (US)

( * ) Notice: Subject to any disclaimer, the term of this patent is extended or adjusted under 35 U.S.C. 154(b) by 0 days.

(21) Appl. No.: 14/636,062

(22) Filed: Mar. 2, 2015

Related U.S. Application Data

(63) Continuation of application No. 14/048,954, filed on Oct. 8, 2013, now Pat. No. 8,971,568.

(60) Provisional application No. 61/795,069, filed on Oct. 8, 2012.

(51) Int. Cl.
| | |
|---|---|
| *G06K 9/00* | (2006.01) |
| *G06K 9/22* | (2006.01) |
| *G06F 3/042* | (2006.01) |
| *G06F 3/0354* | (2013.01) |

(52) U.S. Cl.
CPC ............ *G06F 3/042* (2013.01); *G06F 3/03545* (2013.01)

(58) Field of Classification Search
None
See application file for complete search history.

(56) References Cited

U.S. PATENT DOCUMENTS

| | | | |
|---|---|---|---|
| 4,019,262 A | 4/1977 | Breglia et al. | |
| 4,340,274 A | 7/1982 | Spooner | |
| 5,052,820 A | 10/1991 | McGinniss et al. | |
| 5,107,122 A | 4/1992 | Barkan et al. | |
| 5,115,230 A | 5/1992 | Smoot | |
| 5,521,722 A | 5/1996 | Colvill et al. | |
| 5,559,322 A | 9/1996 | Jacoby et al. | |
| 5,572,251 A | 11/1996 | Ogawa | |
| 5,580,140 A | 12/1996 | Katz et al. | |
| 5,661,506 A | 8/1997 | Lazzouni et al. | |
| 5,812,664 A | 9/1998 | Bernobich et al. | |
| 5,914,783 A | 6/1999 | Barrus | |
| 6,115,022 A | 9/2000 | Mayer, III et al. | |
| 6,195,446 B1 * | 2/2001 | Skoog ................ | G06K 9/00154 382/119 |

(Continued)

FOREIGN PATENT DOCUMENTS

| | | |
|---|---|---|
| EP | 0722109 A1 | 7/1996 |
| JP | 11119184 A | 4/1999 |

(Continued)

OTHER PUBLICATIONS

Savage, P., "GDC 2013: Valv's Michael Abrash on the challenges of VR—'a new world is emerging'," PCGamer, Apr. 2, 2013, 6 pages.

(Continued)

*Primary Examiner* — Randolph I Chu
(74) *Attorney, Agent, or Firm* — John W. Branch; Lowe Graham Jones PLLC

(57) ABSTRACT

A method, apparatus, and manufacture for writing and annotation is provided. An image is provided on a surface. In one embodiment, each time invisible ink is deposited on the surface, the location of the invisible ink deposited on the surface is detected before the invisible ink vanishes from the surface. In another embodiment, when a tip of a stylus is in contact with a location of an image on the surface, employing three or more light detectors to detect light at the location. The detected light is employed to determine a position and an orientation of the tip of the stylus and the location on the surface, and modifying the image based on the stored information.

18 Claims, 13 Drawing Sheets

(56) References Cited

U.S. PATENT DOCUMENTS

| | | |
|---|---|---|
| 6,307,526 B1 | 10/2001 | Mann |
| 6,404,416 B1 | 6/2002 | Kahn et al. |
| 6,545,670 B1 | 4/2003 | Pryor |
| 6,670,603 B2 | 12/2003 | Shimada et al. |
| 6,704,000 B2 | 3/2004 | Carpenter |
| 6,710,767 B1 | 3/2004 | Hasegawa et al. |
| 6,766,066 B2 | 7/2004 | Kitazawa |
| 6,982,683 B2 | 1/2006 | Stanton |
| 7,119,965 B1 | 10/2006 | Rolland et al. |
| 7,144,117 B2 | 12/2006 | Kojima |
| 7,182,465 B2 | 2/2007 | Fuchs et al. |
| 7,232,229 B2 | 6/2007 | Peeters et al. |
| 7,262,765 B2 | 8/2007 | Brown et al. |
| 7,289,110 B2* | 10/2007 | Hansson .............. G06K 9/2081 345/173 |
| 7,303,289 B2 | 12/2007 | Fujiwara |
| 7,511,847 B2* | 3/2009 | Silverbrook ......... B41J 2/16511 235/407 |
| 7,787,134 B2 | 8/2010 | Kohnen et al. |
| 7,911,444 B2 | 3/2011 | Yee |
| 8,170,329 B2 | 5/2012 | Seko et al. |
| 8,282,222 B2 | 10/2012 | Smits |
| 8,297,758 B2 | 10/2012 | Choi et al. |
| 8,430,512 B2 | 4/2013 | Smits |
| 8,493,573 B2 | 7/2013 | Chinn et al. |
| 8,573,783 B2 | 11/2013 | Smits |
| 8,773,512 B1 | 7/2014 | Rafii |
| 8,957,847 B1 | 2/2015 | Karakotsios et al. |
| 9,151,607 B2 | 10/2015 | Davies et al. |
| 2001/0043165 A1 | 11/2001 | Stanton |
| 2002/0067466 A1 | 6/2002 | Covannon et al. |
| 2003/0010888 A1 | 1/2003 | Shimada et al. |
| 2003/0045034 A1 | 3/2003 | Davis et al. |
| 2003/0156260 A1 | 8/2003 | Putilin et al. |
| 2003/0202234 A1 | 10/2003 | Taylor et al. |
| 2003/0202679 A1 | 10/2003 | Rodriguez |
| 2003/0214710 A1 | 11/2003 | Takahashi et al. |
| 2003/0222849 A1 | 12/2003 | Starkweather |
| 2004/0006424 A1 | 1/2004 | Joyce et al. |
| 2004/0054359 A1 | 3/2004 | Ruiz et al. |
| 2004/0114834 A1* | 6/2004 | Fisher .................... G06K 9/22 382/314 |
| 2004/0218155 A1 | 11/2004 | Schenk et al. |
| 2005/0035943 A1 | 2/2005 | Kojima |
| 2005/0052635 A1 | 3/2005 | Xie et al. |
| 2005/0099664 A1 | 5/2005 | Yamaoka |
| 2005/0195387 A1* | 9/2005 | Zhang .................. G01B 11/002 356/138 |
| 2005/0219530 A1 | 10/2005 | Horibe et al. |
| 2005/0273830 A1 | 12/2005 | Silver et al. |
| 2006/0028374 A1 | 2/2006 | Fullerton |
| 2006/0028622 A1 | 2/2006 | Nojima et al. |
| 2006/0132447 A1 | 6/2006 | Conrad |
| 2006/0132472 A1 | 6/2006 | Peeters et al. |
| 2006/0132729 A1 | 6/2006 | Engle |
| 2007/0046625 A1 | 3/2007 | Yee |
| 2007/0053679 A1 | 3/2007 | Beniyama et al. |
| 2007/0138371 A1 | 6/2007 | Marshall |
| 2007/0273610 A1 | 11/2007 | Baillot |
| 2008/0266169 A1 | 10/2008 | Akita |
| 2008/0291213 A1 | 11/2008 | Bhogal |
| 2008/0317077 A1 | 12/2008 | Hoving et al. |
| 2009/0096994 A1 | 4/2009 | Smits |
| 2009/0147239 A1 | 6/2009 | Zhu et al. |
| 2009/0285590 A1 | 11/2009 | Orsley |
| 2010/0002154 A1 | 1/2010 | Hua |
| 2010/0142856 A1* | 6/2010 | Takeuchi ................ G06K 9/22 382/314 |
| 2010/0149518 A1 | 6/2010 | Nordenfelt et al. |
| 2011/0211243 A1 | 9/2011 | Smits |
| 2012/0017147 A1 | 1/2012 | Mark |
| 2012/0132713 A1 | 5/2012 | Chaum |
| 2012/0140231 A1 | 6/2012 | Knox et al. |
| 2012/0187296 A1 | 7/2012 | Hollander et al. |
| 2012/0250152 A1 | 10/2012 | Larson et al. |
| 2013/0003081 A1 | 1/2013 | Smits |
| 2013/0021271 A1* | 1/2013 | Guo ....................... G06F 3/0386 345/173 |
| 2013/0088465 A1* | 4/2013 | Geller .................. G06F 3/03545 345/179 |
| 2013/0176561 A1* | 7/2013 | Hidaka .................. G01B 11/14 356/300 |
| 2013/0229669 A1 | 9/2013 | Smits |
| 2013/0239057 A1 | 9/2013 | Ubillos et al. |
| 2013/0300637 A1 | 11/2013 | Smits et al. |
| 2013/0300670 A1* | 11/2013 | Besperstov ......... G06F 3/03545 345/173 |
| 2013/0342813 A1 | 12/2013 | Wang |
| 2014/0176954 A1 | 6/2014 | Scott et al. |
| 2014/0215841 A1* | 8/2014 | Danbury ................. G01B 5/008 33/503 |
| 2014/0267620 A1 | 9/2014 | Bridges |
| 2014/0273752 A1 | 9/2014 | Bajaj et al. |
| 2015/0066196 A1* | 3/2015 | Wooldridge ......... G01B 21/045 700/195 |
| 2015/0091815 A1* | 4/2015 | Michaelis ................ G06F 3/041 345/173 |
| 2015/0286293 A1* | 10/2015 | Gruhlke ............... G06F 3/03545 345/182 |

FOREIGN PATENT DOCUMENTS

| | | |
|---|---|---|
| JP | 2003029201 A | 1/2003 |
| JP | 2004132914 A | 4/2004 |
| JP | 2011197674 A | 10/2011 |
| KR | 1020110115752 A | 10/2011 |
| WO | 92/18971 A1 | 10/1992 |
| WO | 00/34818 A1 | 6/2000 |
| WO | 2006/063577 A1 | 6/2006 |
| WO | 2009/049272 A2 | 4/2009 |
| WO | 2011/109402 A2 | 9/2011 |
| WO | 2012/054231 A2 | 4/2012 |
| WO | 2014141115 A2 | 9/2014 |

OTHER PUBLICATIONS

European Search Report for European Patent Application No. 08837063.0 mailed Nov. 19, 2010.
Communication Pursuant to Article 94(3) EPC in European Patent Application No. 08837063.0 mailed Dec. 27, 2011.
Communication Pursuant to Article 94(3) EPC in European Patent Application No. 08837063.0 mailed Oct. 22, 2012.
International Search Report and Written Opinion in International Patent Application No. PCT/US2008/079663 mailed Apr. 30, 2009.
International Search Report and Written Opinion in International Patent Application No. PCT/US2011/026691 mailed Oct. 24, 2011.
International Search Report in International Patent Application No. PCT/US2011/054751 mailed Jan. 30, 2012.
International Preliminary Report on Patentability in International Patent Application No. PCT/US2008/079663 mailed Jan. 25, 2010.
International Preliminary Report on Patentability issued in PCT/US2011/026691 on Sep. 4, 2012.
International Preliminary Report on Patentability issued in PCT/US2011/054751 on Apr. 9, 2013.
Official Communication for U.S. Appl. No. 12/249,899 mailed Sep. 14, 2011.
Official Communication for U.S. Appl. No. 12/249,899 mailed Mar. 13, 2012.
Official Communication for U.S. Appl. No. 12/249,899 mailed Jun. 6, 2012.
Official Communication for U.S. Appl. No. 13/037,949 mailed Nov. 2, 2012.
Official Communication for U.S. Appl. No. 13/037,949 mailed Aug. 26, 2013.
Official Communication for U.S. Appl. No. 13/605,948 mailed Dec. 31, 2012.
Official Communication for U.S. Appl. No. 13/858,762 mailed Sep. 13, 2013.
Official Communication for U.S. Appl. No. 13/877,652 mailed Mar. 12, 2015.

(56) References Cited

OTHER PUBLICATIONS

Official Communication for U.S. Appl. No. 14/046,374 mailed Feb. 20, 2014.
European Supplementary Search Report for European Patent Application No. 11834848.1 mailed Feb. 21, 2014.
Official Communication for U.S. Appl. No. 13/858,762 mailed Jan. 31, 2014.
Official Communication for U.S. Appl. No. 14/048,954 mailed Feb. 26, 2014.
Official Communication for U.S. Appl. No. 14/048,954 mailed Oct. 22, 2014.
International Search Report and Written Opinion for application PCT/US2015/023184 mailed Jun. 29, 2015.
Official Communication for U.S. Appl. No. 13/877,652 mailed Aug. 18, 2015.
O'Toole, M., et al., Homogeneous Codes for Energy-Efficient Illumination and Imaging. ACM Transactions on Graphics, 34(4), 35:1-35:13.
Official Communication for U.S. Appl. No. 14/823,668 mailed on May 18, 2016, 10 pages.
Official Communication for U.S. Appl. No. 14/218,643 mailed on Jun. 23, 2016, 11 pages.
Official Communication for U.S. Appl. No. 14/823,668 mailed on Oct. 30, 2015, 12 pages.
International Search Report and Written Opinion for PCT/US2015/044691 mailed on Nov. 18, 2015, 12 pages.
Official Communication for Application U.S. Appl. No. 14/671,904 mailed Sep. 22, 2015, 15 pages.
Official Communication for U.S. Appl. No. 13/877,652 mailed on Feb. 10, 2016, 22 pages.
Official Communication for U.S. Appl. No. 14/823,668 mailed on Feb. 24, 2016, 15 pages.
Official Communication for U.S. Appl. No. 14/671,904 mailed on Feb. 22, 2016, 13 pages.
Official Communication for U.S. Appl. No. 13/877,652 mailed on Aug. 12, 2016, (22 pages).
Official Communication for U.S. Appl. No. 15/194,502 mailed Aug. 19, 2016, (12 pages).
Official Communication for U.S. Appl. No. 14/636,062 mailed on Aug. 24, 2016, (9 pages).
International Search Report and Written Opinion for PCT/US2016/027386 mailed on Aug. 26, 2016, (10 pages).

* cited by examiner

METHOD, APPARATUS, AND MANUFACTURE FOR DOCUMENT WRITING AND ANNOTATION WITH VIRTUAL INK

CROSS-REFERENCE TO RELATED APPLICATIONS

This Utility Patent Application is a Continuation of U.S. patent application Ser. No. 14/048,954 filed on Oct. 8, 2013, now U.S. Pat. No. 8,971,568 issued on Mar. 3, 2015, entitled "METHOD, APPARATUS, AND MANUFACTURE FOR DOCUMENT WRITING AND ANNOTATION WITH VIRTUAL INK," which is based on U.S. Provisional Patent Application No. 61/795,069, filed on Oct. 8, 2012. The benefits of which are claimed under 35 U.S.C. §120 and §119(e), and which are both further incorporated by reference in their entireties.

TECHNICAL FIELD

The invention is related to means of writing and annotation, and in particular, but not exclusively, to a method, apparatus, and manufacture for annotating documents projected on a surface by annotating with invisible ink that vanishes and is replaced by the image projection.

BACKGROUND

With the ubiquity of images that are available for display by an electronic device, the capabilities of a particular electronic device's display have become a significant factor to users. These images can include: movies, videos, podcasts, television, pictures, cartoons, illustrations, graphics, tables, charts, presentations, documents, text, books, e-readers, e-newspapers, and the like. Also, the quality, resolution, and type of display for images that can be displayed by an electronic device are often the primary factors in a user's decision to purchase that particular electronic device.

For example, users' might prefer relatively low power displays for mobile devices, such as mobile telephones, notebook computers, hand held video game consoles, hand held movie players, personal digital assistants (PDA), and the like. These low power displays can include backlit or non-backlit Liquid Crystal Displays (LCD). Further, other relatively low power emissive displays such as Organic Light Emitting Diodes (OLED), are growing in popularity for mobile devices. Also, the size of a display for a mobile device is often limited to a relatively small area, i.e., displays that can easily fit in a hand or clothing pocket. The relatively small size of displays for many mobile devices can also limit their usability for some applications.

Stationary electronic devices, such as personal computers, televisions, monitors, and video game consoles, often employ high power projection display technologies, such as Gas Plasma, Cathode Ray Tubes (CRT), LCD, DLPs (Digital Light Processor), and the like. Also, displays for these relatively stationary electronic devices are often considerably larger than those displays employed with mobile devices, e.g., projection displays can be five feet across or more. However, the relatively large physical size of the cabinetry associated with most displays employed with stationary devices can be inconvenient and unattractive for many users, especially when the displays are not in use.

BRIEF DESCRIPTION OF THE DRAWINGS

Non-limiting and non-exhaustive embodiments of the present invention are described with reference to the following drawings, in which.

DETAILED DESCRIPTION

Figure 1:
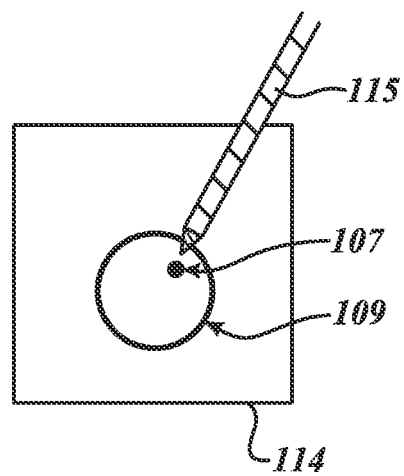
FIG. 1 illustrates a diagram of a stylus making an ink mark on a surface on which there is an image.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "signal" means at least one current, voltage, charge, temperature, data, or other signal.

Briefly stated, the invention is related to a method, apparatus, and manufacture for writing and annotation. An image is provided on a surface. Each time invisible ink is deposited on the surface, the location of the invisible ink deposited on the surface is detected before the invisible ink vanishes from the surface. The invisible ink automatically vanishes from the surface in less than one minute from the time that the invisible ink is deposited on the surface. Location information is stored based on each detected location. The projected image is modified based, at least in part, on the stored location information.

FIG. 1 illustrates a diagram of stylus 115 making ink mark 107 on surface 114 on which there is an image (109).

Stylus 115 may be any normal pen, brush, or the like, which employs vanishing, invisible ink (or solvent), as explained in greater detail below. In some embodiments, stylus 115 may be a fine-tipped pen for writing, annotation, and underlining. In other embodiments, stylus 115 may be broader-tipped for employing as a highlighter or the like. In some embodiments, multiple different types of styluses 115 may be employed depending on the function desired. In some embodiments, multiple styluses 115 may be employed that may be used simultaneously. Stylus 115 need not include any electronics.

As used herein throughout the specification and the claims, the term "invisible ink" refers to ink that is invisible to visible light—but until the invisible ink vanishes, it is still detectable by some means other than visible light, such as infrared, ultraviolet, and/or the like. In some embodiments, the invisible ink is infrared-absorbing, so that it can be detected via infrared. In various other embodiments, the invisible ink may be infrared-absorbing, infrared-reflecting, ultraviolet-absorbing, ultraviolet-reflecting, or the like.

The invisible ink vanishes after some brief period of time that is one minute or less. As used herein throughout the specification and the claims, referring to the invisible ink as "vanishing" means that, when the invisible ink vanishes, the invisible ink is no longer present, or else after vanishing the invisible ink is still present but is not only invisible to visible light, as it was prior to vanishing, but after vanishing the invisible ink no longer detectable by the alternate means by which it was previously detectable (e.g., the ink is also invisible to infrared and ultraviolet after vanishing).

In some embodiments, the invisible ink vanishes after a brief period of time that is significantly less than one minute, such as a few seconds. In some embodiments, the invisible ink vanishes after a very brief period of time that is significantly less than one second, such as one-tenth of a second. In some embodiments, the ink automatically vanishes by means of a chemical reaction, such as automatically with exposure to air, such as nitrogen, oxygen, or carbon dioxide, so that the ink is no longer present after the chemical reaction. In some embodiments, the invisible ink is a volatile liquid that evaporates quickly. In other embodiments, when the ink vanishes, it is still present, but is no longer detectable by the non-visible-light means by which it was previously detectable.

For example, in some embodiments, the link is invisible to visible light and is infrared-absorbing. After a relatively short period of time from being deposited on the surface, the properties of the ink automatically change such that the ink is no longer infrared-absorbing, and the ink can no longer be detected by means of visible light or infrared. In other embodiments, the ink reacts with exposure to some component or components of the air so that the ink is no longer present.

In some embodiments, surface 114 may be any surface on which it is possible to deposit ink, without requiring any modification of the surface. Surface 114 need not include any electronics. For example, some examples of surface 114 include glass, plastic, fabric, and paper. In other embodiments, specific types of surfaces should be used for surface 114. For example, in some embodiments, surface 114 should be a retro-reflective surface. In some embodiments, surface 114 can be a retro-reflective, thin, light weight, foldable, disposable/recyclable, paper-like sheet.

Some embodiments of surface 114 may be paper-like, paper-thin, retro-reflective screens that each require only two layers and one embossing step, which may be carried together in a sheaf of fifty. In some embodiments, surface 114 may be the screen of a regular LCD, a scanned display system (such as a CRT, or scanned laser projector, either front or back projection type system), a reflective e-ink style display, e-paper, OLED, or any other type of display.

In some embodiments, surface 114 may include pre-existing printed text and/or images, such as a map, actual paper documents, and books. In other embodiments, there is no pre-existing printed material on surface 114. Whether or not there is a pre-existing image on surface 114, there is also provided image 109. In some embodiments, the image is provided by means of projected light, so that image 109 is a projected image. However, the invention is not so limited, and means for providing image 109 on surface 114 other than projecting the image are within the scope and spirit of the invention, with some such embodiments discussed in greater detail below. If there is a pre-existing image on surface 114, the pre-existing image along with the provided image 109 together effectively provide a composite image as seen by the viewer.

Surface 114 may even be a screen of a mobile device such as a tablet or phone, or the screen of a television set or monitor, with the "pre-existing image" being the image on the screen. In other embodiments, the image on the screen may be the "provided image", for example a tablet in which the image on the screen may be modified based on the ink marks 107 provided on surface 114.

Stylus 115 may be employed to make an ink mark (107) on surface 114. As discussed above, the ink is invisible and also vanishes after a relatively brief period of time. However, as discussed in greater detail below, although the ink itself is invisible and vanishing, image 109 is modified based on ink mark 107. There are a great variety of different ways that it is possible to modify image 109 with ink 107, many of which are discussed in greater detail below.

However, as one example, writing, mark-ups, or the like may be made with ink 107, which is invisible and vanishing, but image 109 is modified to include a visible mark-up that aligns with the position of ink 107 on surface 114, rather than the ink itself being visible. As discussed in greater detail below, many other types of modification to image 109 can also be made via ink marks 107.

Figure 2:
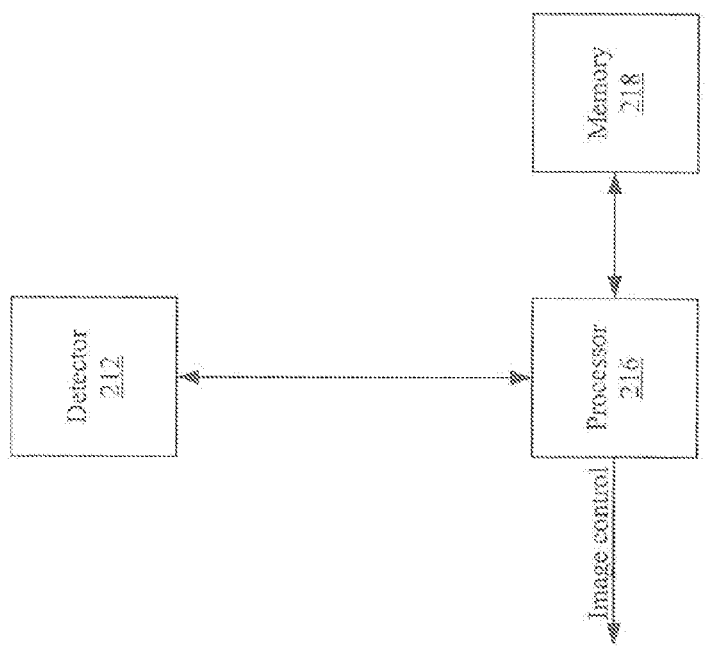
FIG. 2 shows a block diagram of a system that may be employed to detect the ink mark of FIG. 1 and to accordingly adjust the image of FIG. 1.

FIG. 2 shows a block diagram of an embodiment of system 200. System 200 includes detector 212, processor 216, and memory 218. System 200 may be employed in conjunction with embodiments of the components of FIG. 1. Accordingly, discussion of the system of FIG. 2 herein will free incorporate together discussions of components of FIG. 2 in conjunction with components of FIG. 1.

In operation, detector 212 is arranged to detect the location of invisible ink 107 detected on surface 114 before invisible ink 107 vanishes from surface 114, each time ink 107 is deposited on surface 114. Detector 212 is also arranged to communicate location information associated with each detected location to processor 216. The stored location information may also include information about when the ink deposited on surface 114 at each detected time ink was deposited on surface 114.

Processor 216 and memory 218 operate together to store the location information, to modify the image to be provided based, at least in part, on the stored location information, and to provide image control to provide modified image 109. For example, as discussed above, writing, mark-ups, or the like may be made with ink 107, and the image control based on the stored location information of where ink 114 was detected may be employed to cause the a visible mark-up aligning with the observed position of the invisible ink 107 to appear in image 109 as a modification to image 109. As discussed in greater detail below, many other types of modifications to image 109 can also be made via the image control based on the stored location information.

In some embodiments, the image control from processor 216 is provided to one or more projectors that project image 109 onto surface 114. However, the scope and spirit of the invention is not so limited.

In some embodiments, detector 212 is a camera that is capable of detecting infrared light. However, the invention is not so limited, and in various embodiments, detector 212 may be virtually any device capable of detecting invisible ink 107 on surface 114. Of course, as previously discussed, invisible ink 107 may be detectable by different means in various embodiments. In some embodiments, ink 107 is infrared-absorbing (or infrared-reflecting) and detector 212 is an infrared sensor. In some embodiments, ink 107 is ultraviolet-absorbing (or ultraviolet-reflecting) and detector 212 is an ultraviolet sensor. In some embodiments, detector 212 may be an infrared camera or an ultraviolet camera. In some embodiments, detector 212 includes a high-speed camera or sensor arrangement.

Memory 218 may be a processor-readable medium which stores processor-executable code encoded on the processor-readable medium, where the processor-executable code, when executed by processor 216, enable actions to performed in accordance with the processor-executable code. The processor-executable code may enable actions to perform methods such as those discussed in greater detail below, such as, for example, the process discussed with regard to FIG. 3 below. Processor 216 may include one or more processors/processing units such as microprocessors, central processing units, microcontrollers, circuits and/or logic for performing hardware-based processing and calculations, and/or the like.

Although FIG. 2 illustrates a particular embodiment of system 200, other embodiments may be employed with the scope and spirit of the invention. For example, many more components than shown in FIG. 2 may also be included in system 200 in various embodiments. Also, although the determination of image modification to be performed based on the stored location information may be made in software in some embodiments, in other embodiments, the image control determination may instead be performed by hardware, or some combination of hardware and/or software. These embodiments and others are within the scope and spirit of the invention.

In some embodiments, memory 218 is a tangible processor-readable storage medium. As used herein, the term tangible processor-readable storage medium is specifically contrasted with the term transmission medium. The term transmission medium may include processor-executable code that is encoded in propagating signals pre se. In contrast, as the term is used herein, and consistent with the way in which the word "tangible" was interpreted in the Nuijten decision, the term "tangible processor-storage medium" includes at least some processor-executable code is not propagating signals.

Figure 3:
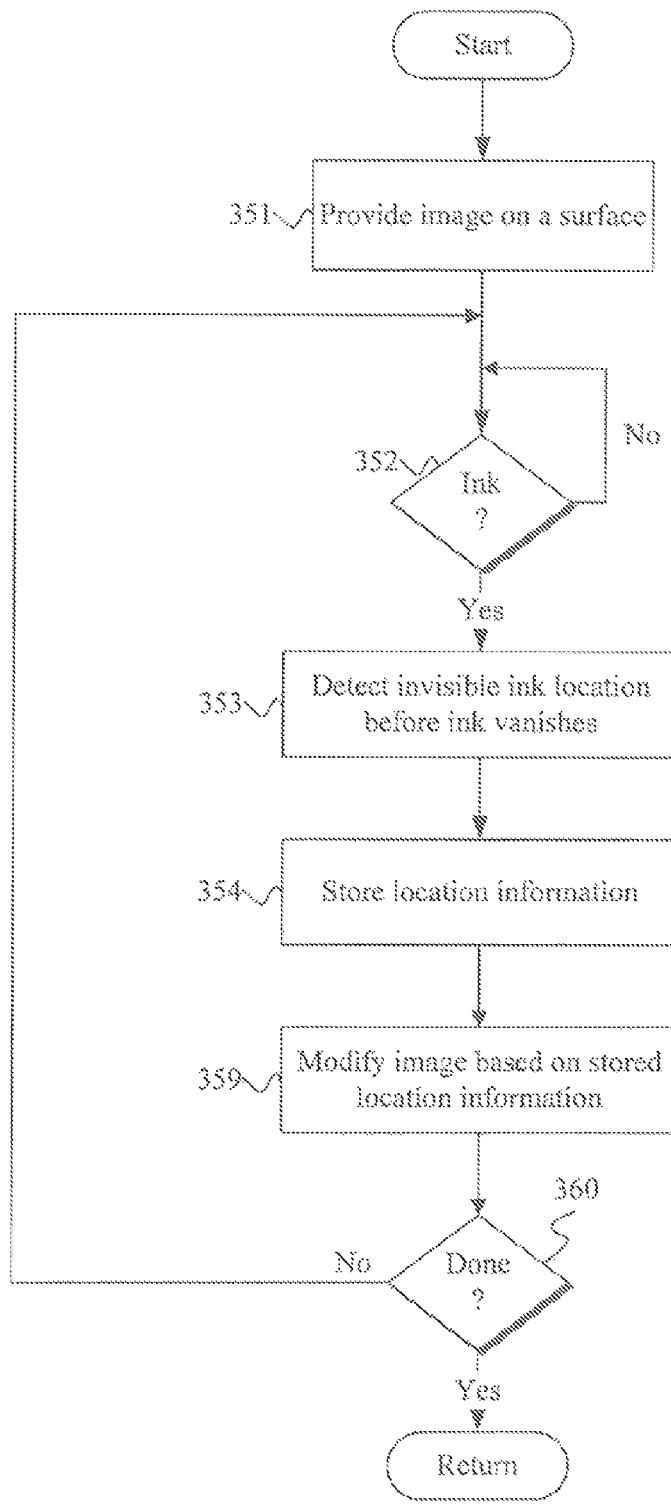
FIG. 3 illustrates a flowchart of a process that may be employed by an embodiment of the system of FIG. 2.

FIG. 3 illustrates a flowchart of an embodiment of a process (350) that may be employed by an embodiment of system 200 of FIG. 2. After a start block, the process proceeds to block 351, where an image is provided on a surface. The process then moves to decision block 352, where a determination is made as to whether invisible, vanishing ink has been deposited on the surface. If not, the process remains at decision block 352, where the monitoring of the surface for invisible, vanishing ink continues.

When the determination at decision block 352 is positive, the process advances to decision block 353, where the location of the invisible, vanishing ink deposited on the surface is detected before the ink vanishes from the surface. The process then proceeds to block 354, where location information based on the previously detected location(s) of the ink is stored. The process then moves to block 359, where the provided image is modified based, at least in part, on the stored location information. The process then advances to decision block 360, where a determination is made as to whether or not the process should continue. If so, the process moves to decision block 352, where the monitoring of the surface for invisible, vanishing ink continues. Otherwise, the process proceeds to a return block, where other processing is resumed.

Although block 351 is shown as the first step, in some embodiments, the surface may begin as a blank screen, with no image being provided until the ink is first deposited on the surface, at which point the image is first provided. In these embodiments, the step at block 351 does not happen first, and the image is not actually provided until after the image is "modified" for the first time at block 354.

As previously discussed, providing the image may be accomplished in some embodiments by projecting the image onto the surface. Projecting the image onto the surface may be accomplished in a number of different ways in different embodiments. In some embodiments, the image may be projected onto the surface with a personal visualization device. In some embodiments, the personal visualization device is a personal visualization device such as the one disclosed in U.S. patent application Ser. No. 13/877,652, entitled "System and Method for 3-D Projection and Enhancements for Interactivity", which is hereby incorporated by reference on its entirety.

While the aforementioned patent application was primarily concerned with 3-D projection and viewing, not all embodiments of personal visualization devices need to use 3-D, and some embodiments provide 2-D views with a personal visualization experience. Also, while the aforementioned patent application primarily disclosed embodiments with retro-reflective surfaces, not all embodiments of personal visualization devices need to retro-reflective surfaces, and some embodiments project an image to provide a personal visualization experience on substantially any surface.

Personal visualization devices, such as those disclosed in the aforementioned patent application, and the like, may be employed so that only the viewer with the personal visualization device can see the projected image, which cannot be observed by other who are not within about 25 mm of the view, so that in practice no one else can view the image.

In some embodiments and/or certain applications, only one viewer may be able to see the image, or one viewer and other authorized parties each having their own viewing device may be able to see the image. In some other embodiments and/or applications which may be selectable in some embodiments, anyone with a viewing device can see the image. In some embodiments, the image may be different in different views. For example, the image may be different to each user according to the view angle, viewing distance, security clearance of the viewer, and/or the like.

In some embodiments, the personal visualization device may use lasers and/or highly-collimated LED light sources to avoid the need for focusing. In some embodiments, a personal visualization device includes a head-mounted projector that projects the image onto the surface so that only the viewer, wearing the head-mounted projector, can see the projected image. In some embodiments, the head-mounted projector includes two projectors, one mounted on either side of the viewer's head, where the retro angle for each eye is small so that each eye can only see the image of one of the projectors at a given distance from the screen. The projected image in this case is the effective image seen by the viewer based on the images seen by each eye of the viewer.

In other embodiments, personal visualization devices are not employed, and the image may be projected in a manner that is publically visible, without others requiring a device to see. In some embodiments, the image may be projected by an image projection device, such as the one disclosed in U.S. Pat. No. 8,282,222, entitled "Image Projector with Reflected Light Tracking", which is hereby incorporated by reference on its entirety.

In other embodiments, the image may be provided in some manner other than projecting the image. For example, in some embodiments, the provided image may be an image on a tablet or other mobile device. In some embodiments, a camera may be used, for example as an add-on or accessory to a mobile device such as a tablet, ebook, or the like, with the annotations being detected by the camera, and communicated from the camera to the mobile device so that the changes to the image are made on the mobile device based on the information communicated from the camera to the mobile device.

In some embodiments that employ mobile device screens as the provided surface, the ink may be used directly on the surface, and in others, a transparent wrap may be placed over the device screen so that the ink may be deposited on the wrap over the screen rather than directly on the screen. The image control may then be provided by the system to the mobile device so that the mobile device can modify the image based on the provided image control. In some embodiments, the image control may be provided by the system to the mobile device via Bluetooth.

Besides a wrap placed over a device, a screen protector may also be employed as a surface on which ink may be deposited. For example, some embodiments may be employed with a screen protector for non-touch devices with fiducials, to add writing and interaction to a non-touch display.

Further discussion about the ink itself, detecting the ink, the surface, and modifying the image based on the ink, in various embodiments, is given in further detail above and below. As discussed above and below, the invisible ink vanishes from the surface in less than one minute from the time that the invisible ink is deposited on the surface. In some embodiments, the invisible ink vanishes in a time frame that is substantially less than one minute.

Figure 4:
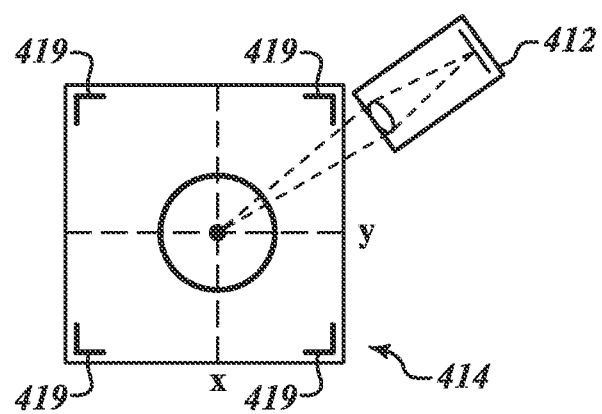
FIG. 4 shows a diagram of the detector of FIG. 2 and the surface of FIG. 1, where the surface has fiducial or edge markings.

FIG. 4 shows a diagram of a detector 412 and surface 414, where surface 414 has fiducial or edge markings 419. Detector 412 and surface 414 may be employed as embodiments of detector 212 of FIG. 2 and surface 114 of FIG. 1, respectively.

In operation, detector 412 detects ink marks and provides time and image location referencing the observed fiducial markings 419 for ink marks observed by detector 412. In some embodiments, the provided time and image location may be stored in memory, such as an embodiment of memory 218 of FIG. 2. For example, the information may be stored as x, y, t information associated with ink deposited on surface 414. The x, y information is relative to surface 414 itself. For example, surface 414 and/or detector 412 may move, but the x, y information is the ink mark relative to the surface itself (and/or a pre-existing image on surface 414).

In various embodiments, the edges of screen themselves may be used as fiducials, or the images may be used as location markers (e.g., in printed matter).

In some embodiments, fiducial or edge markings 419 on surface 414 may assist in the determination of the x, y coordinates relative to surface 414 (and/or a pre-existing image on surface 414). The t information is the time of the mark event in which the ink mark was detected at the x, y location. Successively recorded mark events form a trajectory ("stroke") with certain velocity, which allows for an accurate determination of the initial "impact" of the stylus, even when there is a certain latency of observation.

In a mobile environment, the projector and the writing surface are typically in motion. Accordingly, the projected images are in motion. Some embodiments of the invention are able to selectively tether and un-tether the mark-ups at will to the screen or to the real world (e.g., if the screen is a window) and do so relatively rapidly, such within 20 milliseconds. That is, some embodiments are capable of tethering the referencing of images and views to the surface and changing perspectives based on the position of the surface relative to the viewer (i.e., the viewer's head and eyes). Accordingly, some embodiments enable motion-stabilized, object-referenced, or screen-referenced mark-ups. This may be helpful in many ways, including avoiding motion sickness, because the human vision system expects images to be part of our normal worldview, not attached/referenced to one's head.

Figure 5:
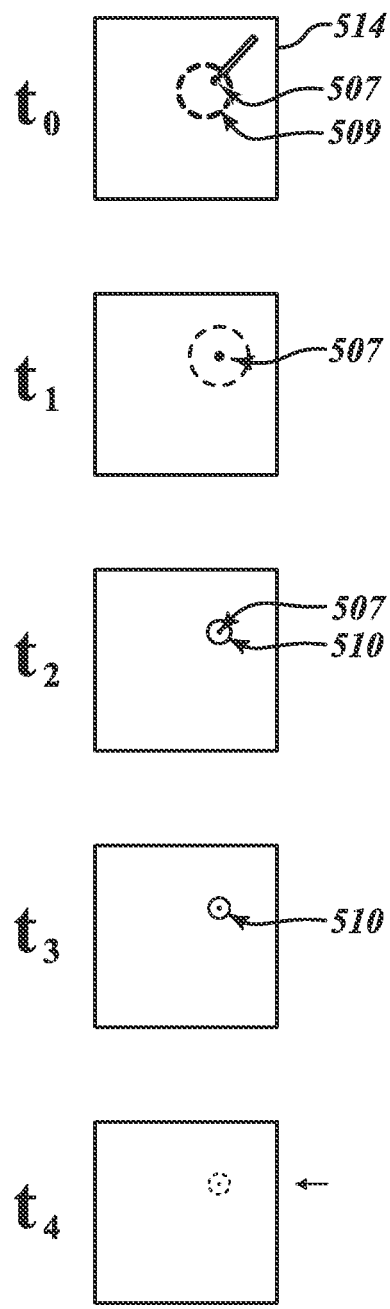
FIG. 5 illustrates a diagram of the inking time sequence in accordance with an embodiment the process of FIG. 3 being performed on the components of FIG. 1.

FIG. 5 illustrates a diagram of the inking time sequence in accordance with an embodiment the process of FIG. 3 being performed on the components discussed in FIG. 1. Prior to time t0, surface 514 has an image 509. As shown in FIG. 5, at time $t_0$ an invisible ink mark 507 is made to surface 514. At time $t_1$ the step of block 353 occurs, where the mark location is determined by a detector (e.g. detector 212 of FIG. 2), which may be, for example, a sensor or a camera. At time $t_2$ a visible image 510 is superimposed on the mark at that location in accordance with the step at block 359. At time $t_3$ the invisible ink mark 507 vanishes. At time $t_4$ the invisible ink mark is no longer required, and no trace is left on the screen.

FIG. 5 shows a particular example of modifying the provided image based on the stored location information. In particular, it shows modifying the provided image to include a visible mark-up that aligns with the position of the ink on the surface. In other embodiments, other modifications to the provided image may be provided based on the ink marks, as discussed in greater detail below.

Figure 6:
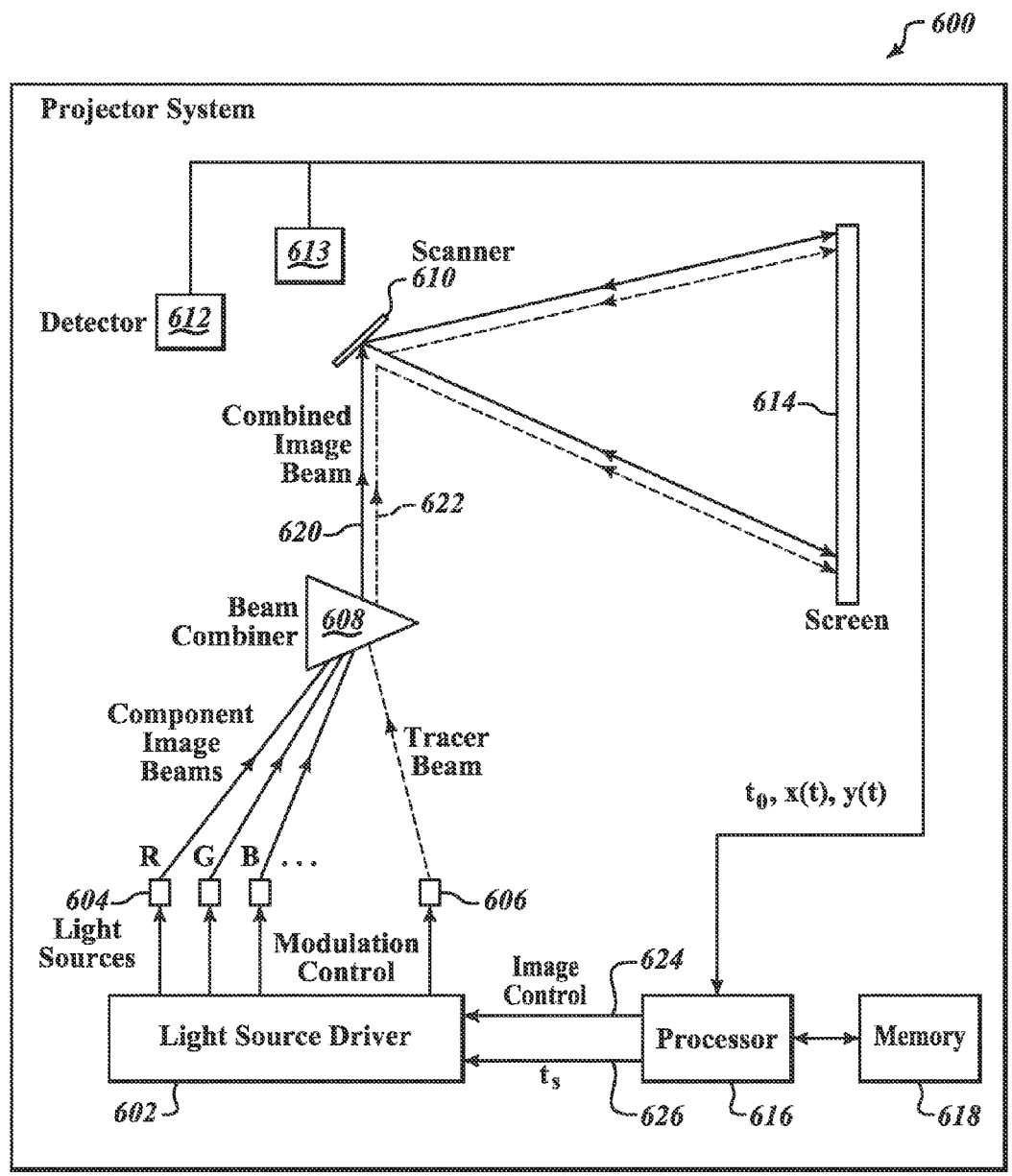
FIG. 6 shows a block diagram of embodiment of the system of FIG. 2.

FIG. 6 shows a block diagram of embodiment of system 600, which may be employed as an embodiment of system 200 of FIG. 2. Described below is a particular embodiment of system 600 that employs an image projection device, such as the one disclosed in U.S. Pat. No. 8,282,222, entitled "Image Projector with Reflected Light Tracking". However, as discussed in greater detail above and below, other embodiments may employ other means of image projection (including, e.g., personal visualization devices), and/or provide the image by means other than image projection.

System 600 includes a light source driver 602 for modulating component image beams, generated by light sources 604, and for controlling tracer beam generator 606. The component image beams are combined using a beam combiner 608 that produces a combined image beam 620. The combined image beam is directed to a scanner 610, which reflects the combined image beam to a screen 614, where screen 614 may be employed as an embodiment of surface 214 of FIG. 2. Combined image beam 620 includes information about a known image to be displayed. The information about the known image is projected pixel sequentially (serially pixel by pixel) onto screen 614 using the consecutive projected scanlines causing the known image to appear on screen 614. The formation of the known image on the screen may take a few milliseconds or less.

Tracer beam 622 used for scanline trajectory prediction is also directed to scanner 610 and reflected to screen 614. Detector 612 is used to detect the reflection of the tracer beam off screen 614. Detector 612 sends timing $t_0$ and screen position information [x, y] to processor 616 coupled with memory 618 holding an image to be displayed on screen 614. Processor 616 also employs stored location information related to deposited invisible ink marks (received from detector 612 or a separate detector that is not shown), and modifies the image held in memory 618 based, at least in part, on this information. Detector 612 can also be used to optionally detect the reflection of the image beam off screen 614. Additionally, in at least one embodiment, a separate detector 613 can be included to separately detect the reflection of the image beam off screen 614. Detector 612 may also perform the function of detector 212 of FIG. 2, or separate detectors may be employed for detecting the invisible ink and detecting tracer beam. In either case, a detector (either detector 212 or a separate detector that is not shown in FIG. 6) detects the invisible ink and provides information about the location and time of the mark event to processor 616. Processor 616 is also coupled with light source driver 602 to control the modulation of component image beams, and generation of tracer beam 622 by tracer beam generator 606.

In one embodiment, component light sources 604 include RGB. In another embodiment, component light sources 604 may include other color components such as orange, yellow and violet in addition to RGB. In one embodiment light sources 604 are LEDs (Light Emitting Diode), while in another embodiment, light sources 604 are lasers. In yet another embodiment, light sources 604 are laser diodes. Those skilled in the relevant arts will appreciate that many types of light sources may be used to generate component lights, such as red, green, and blue, and the like, without departing from the spirit of the disclosure. For example, in some embodiments, a white LED may be used as a light source. Additionally, some embodiments of system 600 may further include an infrared or an ultraviolet light source 604 in addition to the R, G, and B light sources 604 shown in FIG. 6 so that the invisible ink may be detected by reflecting or absorbing the infrared or ultraviolet light source.

Component light sources 604 produce component image light beams that are combined by a beam combiner 608 to produce a combined image beam. In one embodiment the beam combiner 608 is an optical device, such as a prism, dichroic mirrors, or the like. In another embodiment, the beam combiner 608 is an electronic device that may be used to convert light components into electrical signals, mix the electrical signals into a mixed signal, and convert the mixed signal back into a combined image beam. An electronic mixer may be used if intermediate processing of the light beam, such as digital or analog filtering or other control and processing, is desired.

In one embodiment, scanner 610 may be a MEMS device with a precision built mirror with at least a two-axis gimbal for independently controlled rotation about two orthogonal axes. In this embodiment, the mirror may pseudo-randomly project scanlines covering any screen position on the surface of screen 614. In another embodiment, scanner 610 may be a mirror with other types of directional controls, such that a scanline may be projected on every screen position on screen 614. For example, polar or cylindrical adjustments and corresponding controls may be used to point the mirror to direct the reflection of image beam to any screen position on screen 614. Because of the rotation of the mirror, a scanline projected on screen 614 may have a slight curvature instead of being a straight line. Scanner 610 may work in a color sequential mode, where the image beam sequentially varies across multiple colors and the image is reconstructed by the viewer by virtue of time integration of the various color values observed.

In another embodiment, that may be useful for highly mobile images, such as movies, a multiple-color system may be implemented using multiple primary colors simultaneously. The primary colors may be separated out by using a prism, dichroic beam splitters or dichroic mirrors, or by using separate sub-pixels with color filters. In another embodiment, a full, broad-spectrum white source may be used for illumination, and the white beam may then be split into its color components which are separately observed by multiple lines in a linear array sensor.

A particular scanline projected by the scanner 610 onto the screen 614 is not aimed, in a feed-forward fashion, at any particular predetermined position (or curve, when referring to all points on the scanline) on the screen 614. Rather, the scanline is pseudo-randomly projected at some arbitrary position on the screen 614 and the arbitrary position is observed and detected by a detector, more fully described below. This feedback arrangement is generally more precise and accurate than feed-forward, because the actual position of the projected scanline on the screen is determined, instead of a predicted feed-forward position, which may be off due to many causes, such as vibration of the scanner 610 and/or the screen 614. Feedback inherently makes image correction on the screen possible, for example, to counter screen imperfections and/or vibrations, because feedback is after-the-fact observation of an event (e.g., scanline position on the screen), rather than before-the-fact prediction and/or specification of the event, as is the case in feed-forward systems.

In one embodiment, screen 614 is a typical front projection screen with a high reflective index. In another embodiment, screen 614 is a back projection screen with diffuse transmittance for passing light through. In this embodiment, the other components shown in FIG. 6 are arranged to project the image onto the back of the screen to be viewed from front of the screen by a viewer. In another embodiment, screen 614 may be a light colored wall or any other flat surface. In yet another embodiment, screen 614 may be any surface with or without texture. The feedback feature of PSTP 600 may automatically compensate for surface imperfections, texture, and irregularities of screen 614.

In one embodiment, detector 612 is a monochrome camera. The monochrome camera detects single colors, such as red, green, or blue. Monochrome cameras may also detect IR light. A monochrome camera may be useful when the tracer beam 622 is a visible pulsed light beam. In this embodiment, the light beam pulses are of short enough duration that would be imperceptible to the human eye. In another embodiment, detector 612 may be an IR detector used to detect pulses projected by the tracer beam 622. In yet another embodiment, detector 612 may be a CCD (Charge Coupled Device) array. The CCD array may be a single row CCD array or it may be a two dimensional CCD array. In yet another embodiment, multiple single row CCD arrays may be used. In this embodiment, a two-dimensional projected image is optically collapsed into two orthogonally related linear image components. In still another embodiments, if a singular target object, for example, a single screen position the light level of which exceeds a pixel threshold of a detector array (for example, CCD array), a folding optics arrangements may be used to superimpose a dimension Y (for example, vertical) of an image onto a dimension X (for example, horizontal) of the image so that information contained in both dimensions may be measured and detected by a single linear CCD array. The folding optics arrangement may be implemented using a mirror, a half-mirror (for beam splitting), or a reflecting prism, among other options.

When a pixel in detector 612 array exceeds the threshold value, a pixel "hit" event, the address of the pixel is reported, for example to processor 616 (see FIG. 6), together with the measured light value for the corresponding screen position. For example, the data that is reported to processor 616 may take the form of a 2-tuple [Address of pixel N, Value of pixel N]. Either concurrently or afterwards, the pixel is reset, so the pixel is ready to detect the next event, for example, another screen position the brightness of which exceeds the pixel threshold. All other pixels in detector 612 array are unaffected during the detection reset cycle and pixels in detector 612 array may operate fully asynchronously. Multiple pixel hit events may be detected at the same time.

In one embodiment, processor 616 is a programmed microprocessor coupled to memory 618, where memory 618 contains the image to be displayed. In one embodiment, light source driver 602 is a circuit for modulating light sources 604 according to image control signals 624 output from the processor 616. Light source driver 602 may also process timing information $t_s$ 626 to control tracer beam generator 606. In one embodiment, light source driver 602 modulates light sources 604 and controls tracer beam generator 606. In another embodiment, light source driver 602 may be implemented as two separate modules, one for controlling light sources 64 and one for controlling tracer beam generator 606.

Not all the components shown in FIG. 6 may be required to implement system 600 and variations in the arrangement and type of the components may be made without departing from the spirit or scope of the disclosure. For example, light source driver 602 and processor 616 may be integrated into one device. Conversely, light source driver 602 for modulating component light sources 604 may be a device that is distinct from processor 616. Similarly, in various embodiments, detector 612 and scanner 610 may be integrated together or may be implemented as discrete components.

In operation, with continued reference to FIG. 6, scanner 610 pseudo-randomly sweeps screen 614 with scanlines. In one embodiment, a random number generator is used to generate at least a component used to perform pseudorandom sweeps for scanner 610. In another embodiment, physical features may be used in the structure of scanner 610 to introduce pseudo-randomness in the sweep direction of the mirror employed in scanner 610. For example, irregular mechanical features, optical features, electrical currents, magnetic fields, or thermal fluctuations may be used to introduce such randomness. As scanner 610 sweeps across screen 614, the tracer beam 622 is reflected by scanner 610 and projected onto screen 614. Subsequently, tracer beam 622 is reflected back by screen 614 and is detected by detector 612. In one embodiment, tracer beam 622 is a pulsed IR beam. In another embodiment, tracer beam 622 is composed of short duration visible light pulses. Those skilled in the art will appreciate that a behavior pattern that may appear random at one level of detail may be deterministic at a more detailed level. For example, a pseudorandom behavior pattern at micro-second level of detail may be entirely deterministic at a nanosecond level of detail. For instance, regular events at nanosecond time resolution, when combined into longer units of time, may give rise to higher level events that appear random.

Detector 612 determines the screen position as defined by a pulse from tracer beam 622. Processor 616 predicts the subsequent screen positions based on the previous screen positions on the same scanline. The subsequent screen positions are used to obtain image pixel information from memory 618 and display on the subsequent predicted screen positions. In one embodiment, the image pixel information from memory or another image source, such as a graphic engine, may correspond to one or more screen positions. Additionally, the image stored in memory 618 is modified by processor 616 based on the detected ink marks deposited on screen 614, as discussed in greater detail elsewhere. The image to be displayed may be a described as a polygonal element or continuously interpolated color mapping. This process may be continuously repeated for pulse after pulse.

For each detected pulse, the corresponding screen position information is provided to processor 616 by detector 612. In one embodiment, the screen position information may include raw data as collected by detector 612, for example, an array index of detector 612. In this embodiment, the raw data may be further processed by processor 616 to calculate the [X, Y] coordinates of the detected pulse. In another embodiment, the screen position information may include [X, Y] coordinates of the detected pulse, as determined by detector 612. Detector 612 may also provide time of detection, $t_0$, to processor 616. The time of transmission of the tracer beam from the tracer beam generator 606 to processor 616, the pulse "flight time," may be calculated by subtracting the time of generation of the pulse from the time of detection of the pulse. The pulse flight time may be used to estimate the distance of the particular point on screen 614 where the pulse was detected to scanner 610. Knowing this distance enables processor 616 to adjust the brightness and modulation of the component image beams, and tracer beam pulse frequency to compensate for a rough or irregular surface of screen 614.

In one embodiment, successive screen positions traversed by the pseudorandom scanlines, used to project combined image beam 620 onto screen 614, are looked up by high speed processor 616 in a memory reference table and the color values of the image to be displayed corresponding to the screen positions are rendered on the screen positions nearly instantaneously. Hardware graphics processors can look up such color values and any related computations at multiples of GHz clock speeds. Thus, pixel color values, typically specified as 24, 32 or 48 bit color vectors, can be computed billions of times per second, with a latency of about a few nanoseconds. This rate of processing is more than sufficient to render the equivalent of 30 frames of two million pixels each second (60 million vectors per second).

Thus, such computational speeds are more than sufficient for system 600 to render HDTV (High Definition TV) quality video.

As discussed above, although specific embodiments of system 600 described herein have discussed the details of a projection system that uses an image projection device, other embodiments may employ other means of image projection, such as a personal visualization device. As discussed in greater detail above, a personal visualization device may be used to project the image such that the image is either only viewable by the user or only viewable by the user and certain authorized individuals.

Some embodiments of system 600 employ a personal visualization device with a tiny head-mounted camera. Some embodiments of system 600 that employ a tiny head-mounted camera require a retro-reflective surface. Other embodiments of system 600 that employ a head-mounted camera may allow system 600 to be used with existing displays, any paper, or any surface on which the invisible ink/solvent can be deposited.

Because processor 616 modifies the image stored in memory 618 based on the detected ink marks in screen 614, the projected image is modified based on ink marks made on screen 614. In some embodiments, processor 618 executes processor-executable code stored in memory 618 to perform the process illustrated in FIG. 7.

Figure 7:
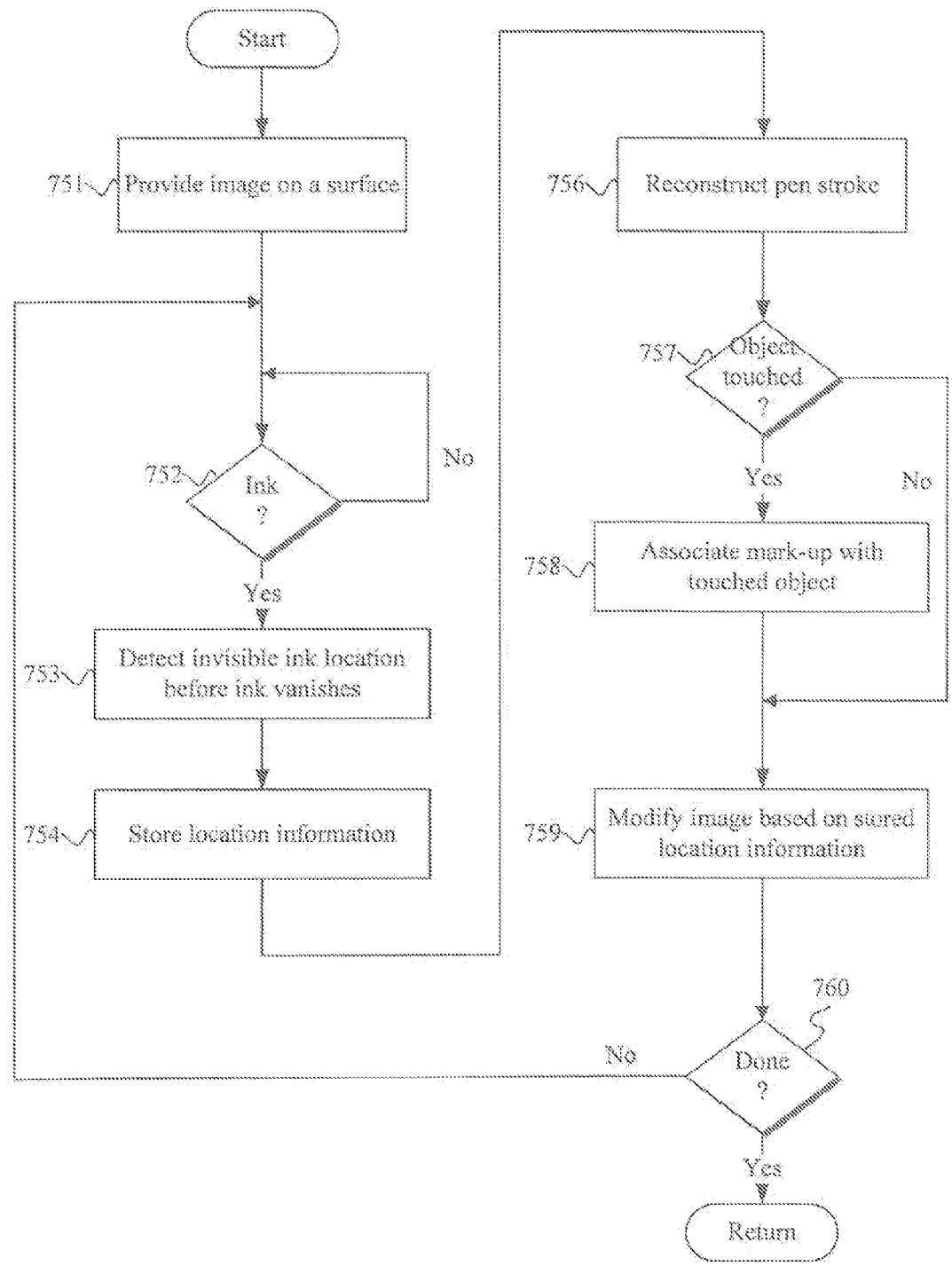
FIG. 7 illustrates a flowchart of an embodiment of the process of FIG. 3.

FIG. 7 illustrates a flowchart of an embodiment of a process (750) that may be employed as an embodiment of process 350 of FIG. 3, and which may be employed by an embodiment of system 600 of FIG. 6. After a start block, the process proceeds to block 751, where an image is provided on a surface. The process then moves to decision block 752, where a determination is made as to whether invisible, vanishing ink has been deposited on the surface. If not, the process remains at decision block 752, where the monitoring of the surface for invisible, vanishing ink continues.

When the determination at decision block 752 is positive, the process advances to decision block 753, where the location of the invisible, vanishing ink deposited on the surface is detected before the ink vanishes from the surface. The location X on the screen is then detected by a detector (e.g., a camera or a sensor) that marks the location of the deposited ink relative to the displayed image and the display surface. In some embodiments, detecting the location relative to the displayed image and the display surface may be accomplished by concurrently observing the image on the screen, edges or fiducials on the screen, or of projected or pre-existing images. A high-speed camera or sensor arrangement and processing on GHz class GPU (Graphics Processing Unit) that can be found in the latest generation portable devices is powerful enough to distinguish each of the motion components.

The process then proceeds to block 754, where location information based on the previously detected location(s) of the ink is stored. The stored location information also includes the time of the mark-up (i.e., when it was detected). The time information may be used later in, e.g. a "replay" style animation, for a revision control, or as part of an "Undo" function.

The process then moves to block 756, where the trajectory of the successive pen positions on the surface (i.e., the pen stroke) is reconstructed. Despite the short "exposure time" of the rapidly vanishing ink, in some embodiments, the trajectory of the successive pen positions on the surface can be reconstructed with great precision by a process of "backtracking" or reversing the observed time series—the series of positions observed of a pen in motion. This observed motion can have several components: a combination of a moving pen, a moving surface, and a moving viewpoint (a mixture of visual flow, ego-motion, and screen motion with respect to the viewer). Block 756 is an optional step that is not included in some embodiments of process 750.

The process then advances to decision block 757, where a determination is made as to whether the last mark-up should be associated with an object in the field of the view as a result of the mark-up "touching" on object, either in the provided image or the pre-existing image, if any. As previously discussed, each of the motion components is distinguished from the others. As a result, even a rapidly moving object can be "touched" (intercepted) by the pen with great precision. If the determination at decision block 757 is negative, the process proceeds to block 759. However, if the determination as decision block 757 is positive, the process advances to block 758, where the mark-up is associated with the object.

The process then moves to block 759, where the provided image is modified based, at least in part, on the stored location information. For some mark-ups, the display system creates a visible mark-up which aligns with the observed position of the invisible ink. Feedback from the viewpoint sensor enables a precise alignment between the mark-up and the observed screen position, consistent with the current view angle of the viewer. This may be of particular importance in large LCD "super screens" or tiled arrays. For example, in "ruggedized" large area displays found in industrial control rooms, the cover glass is often thick and a significant source of parallax distortion when details are viewed from oblique angles close to the surface. By using "digitized/virtual" ink, augmented reality type annotation marks can be adjusted to stay aligned with the underlying image detail, regardless of the view angle.

As a result, multiple viewers in different positions will see their annotations with great accuracy regardless of the view angle. The view position can be completely unconstrained. Furthermore, the scale and detail of the annotations may depend on the viewing distance, and/or the security clearance level of the observer.

The process then advances to decision block 760, where a determination is made as to whether or not the process should continue. If so, the process moves to decision block 752, where the monitoring of the surface for invisible, vanishing ink continues. Otherwise, the process proceeds to a return block, where other processing is resumed.

In some embodiments, the invisible, vanishing ink automatically vanishes as follows. At the end of the exposure time—by a chemical process such as exposure to air (nitrogen, oxygen or carbon dioxide), the ink vanishes, leaving the screen completely clear, ready for new annotations. This vanishing feature also insures that the mark-ups are not recordable, at later time, by unauthorized parties. This provides an extra level of privacy and security, e.g., when handling classified information or images in public places.

Embodiments of system 600 and/or process 750 enable invisible ink to be recognized by an IR-sensitive (or UV-sensitive) sensor or camera. The invisible ink is made visible to the user by electronic means. In some embodiments, the resulting "virtual ink" is discernible only by the author and, in some embodiments, only by intended recipients, forming a crucial element of a secure information access control and collaboration system. The invisible ink is formulated such that, after detection by the sensor, the invisible ink vanishes without leaving a trace on the screen. The system enables a natural style of writing and annotation, and can be applied to any surface, without requiring a modification of the surface.

Embodiments of system 600 and/or process 750 enable writing and annotating a document or image projected on a surface with the ability to provide the highest level of privacy and information security for highly sensitive documents, images, and/or the like. Documents can be handled with the ease of paper but without leaving a paper trail. Highly sensitive document images and interactive applications can be received, reviewed, signed or otherwise authenticated, and shared, combining the power of augmented reality with the natural simplicity of a pen on paper.

Embodiments of system 600 and/or process 750 also enable such writing and annotation with a natural user experience. Any existing passive surface can be used and all of the user experience (touch detection and haptic feedback—feeling the pen touch the surface) is entirely natural. People already know how to dot the I's, cross the T's, how to cross out, how to underline, how to use a check-mark to select, and how to circle and highlight something. The writing instrument can be any normal pen or brush, so enabling a simple, natural, cheap, and elegant approach. The briefest jab of invisible ink on the surface provides instantaneous, subtle but unambiguous haptic and visual feedback. Accordingly, the actual ink vanishes, while the display system generates an appropriate visual (or even aural) response: a clear mark in any color, shape, translucency, duration, or even motion (e.g., bubbles).

In various embodiments, the image can be modified in different ways based on ink mark-ups. As discussed above, where the invisible ink was deposited, the image control can provide a mark in any color, shape, translucency, duration, or even motion. Also, the system visualization response may be dependent on the nature of what is being annotated. The visualization can be color-adjusted to provide added/suitable contrast (to avoid green-on-green, black-on-black etc.) or to differentiate revisions or identify authors. The latter may particularly useful in a multi-screen collaboration system.

Further, in various embodiments, the pen can do everything a mouse can do, including: click, scroll, select, and/or the like. Convenient, selective undo and erase options may also be provided. Modifying the image in accordance with ink marks made to perform such function can be made in a context-sensitive manner, with the processor determining the intended function based on the detected ink marks.

Because the ink vanishes, the same screen may be used as a blank slate on a subsequent occasion for a new document. Alternatively, a previous document can be retrieved from memory to resume work on the previous document. Also, because the ink vanishes, a printed document may be annotated without actually altering the original printed document. But the annotation can also be returned to the document virtually without the annotation actually being on the document. The image of the original document can be stored in memory so that when the same document is viewed at a later time, the system can return to the original annotated version of the document by projecting the image for the annotations for that document.

Because all of the annotation is time-stamped, it is possible to undo the annotations at will. It is also possible to track who made each annotation, for example by color coding.

In some embodiments, annotations are made with the pen, and erasing can be performed by wiping a finger over the annotations that are desired to be erased. In this way, certain modifications to the image can be made on the screen by more than the ink itself, including via touch without using ink.

In some embodiments, multiple markers or a succession of quick marks (providing backstops) may serve as a multipoint touch interface. Also, in some embodiments, inking strength may serve as a force sensor (with soft tip marker, a fat dot or mark signals more pressure, while a light dot is less). In other embodiments, the pen includes a force feedback sensor via an additional signal path to the system.

Figure 8:
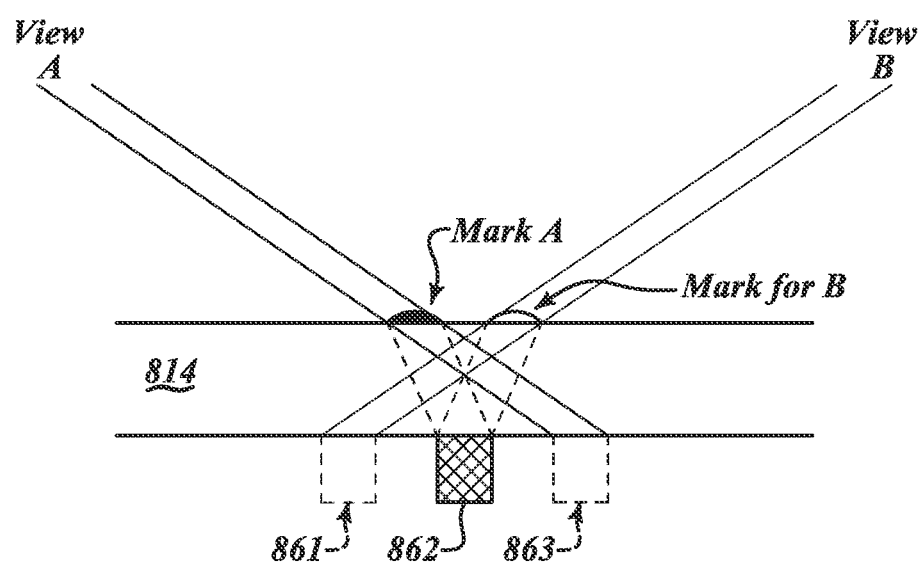
FIG. 8 shows a diagram of an embodiment of a surface with a pixel viewed from different viewpoints A and B.

In some embodiments, eye alignment precision and surface detection visual parallax errors associated with current touch surfaces may be eliminated. FIG. 8 shows a diagram of an embodiment of surface 814 with a pixel viewed from different viewpoints A and B. As shown in FIG. 8, the same display pixel will align to view different ink marks at opposite viewpoints A and B. The display pixel is actually at location 862, but is perceived to be at location 861 by viewpoint B, and is perceived to be at location 863 by viewpoint A.

Figure 9:
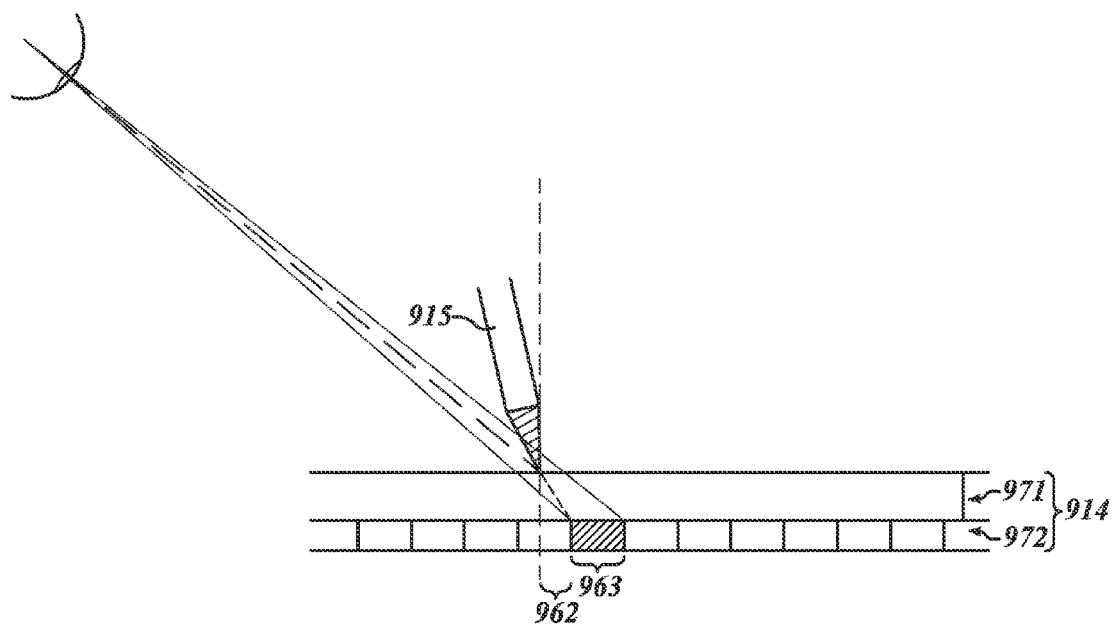
FIG. 9 illustrates a diagram of a parallax view of a surface showing how the perceived location of a pixel buried under a cover glass is shifted away from the viewer.

FIG. 9 illustrates a diagram of a parallax view of surface 914 showing how the perceived location of a pixel buried under a cover glass (971) is shifted away from the viewer. An ink mark 907 has been made on surface 914 by stylus 915. Surface 914 includes cover glass 971 and display 972, which may be, for example, a Liquid Crystal Display (LCD) or Organic Light-Emitting Diode (OLED). A display pixel has an actual location 962 and a perceived pixel location 963.

Figure 10:
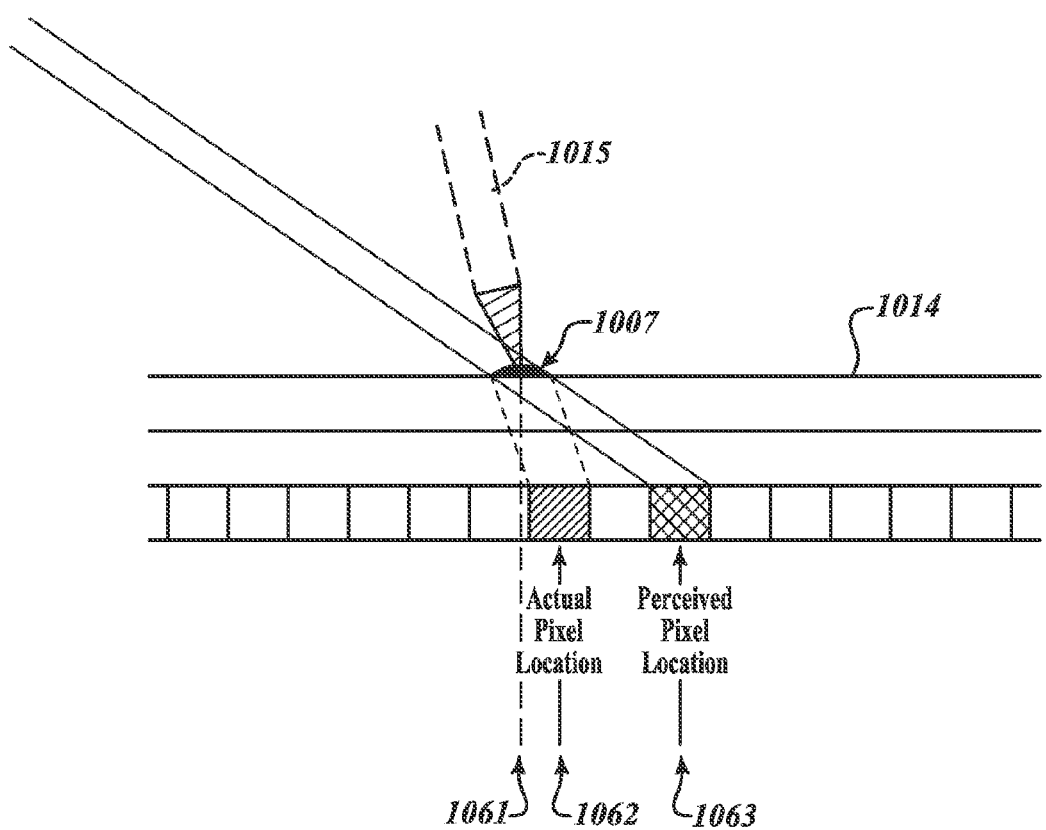
FIG. 10 shows a more detailed diagram of the parallax view of FIG. 9.

FIG. 10 shows a more detailed diagram of the parallax view of surface 914, which is labeled as surface 1014 in FIG. 10. FIG. 10 shows in greater detail stylus 1015, ink marking 1007, and the image displayed under glass. Position 1061 is where the marking coincides with the perceived pixel location (perceived at pixel position 1063), whereas the actual image pixel is at pixel position 1062. With knowledge of the viewer's position, the system can correctly associate position 1061 with position 1062 rather than position 1063.

The camera sees the marking (the invisible ink) on the surface close to where the eye perceives the image. In the case of an LCD or rear projection display, the pixel is a certain distance below the surface. Accordingly, the perceived location of the image is like the perceived location of a fish swimming some distance below the surface of a stream. Due to the refraction of light, the perceived location of the fish is further away from the viewer than the actual location. Any surface touch system with a built-in touch detection system, unless it is aware of the location of the viewer (the perspective angle)—for any angle of view other than orthogonal—will introduce a view-touch parallax error between the viewer's perception and the system's touch registration, as shown in FIG. 10. According to the configuration employed in some embodiments of system 600, this error is eliminated by observing the ink mark-up (on the surface of the display) with the correct viewer perspective against the image underneath the glass.

In a front-projected display, this parallax error can be eliminated completely, because both the projected image and the marking are (or can be) exactly on the same surface, and are viewed from the same perspective.

Some embodiments of system 600 and/or process 750 may employ 3D images and 3D markings. In a stereoscopic 3D system, the surface writing—once digitized—is fully synthesizable. It can be treated as any normal 3D image Annotations can be spatially detached from the writing surface.

For example, in the case of a table, the user might see a 3D object stereoscopically in this view. The object can be annotated at Z level of the projection surface (the pen touches the image at that projection surface, which in depth coordinates by convention is usually where Z=0) but the viewer may choose to change perspective and the markings will stick to the marked-up object and can be projected with the right perspective and disparity consistent with the new view and the new positions in the field of view of the object.

Figure 11:
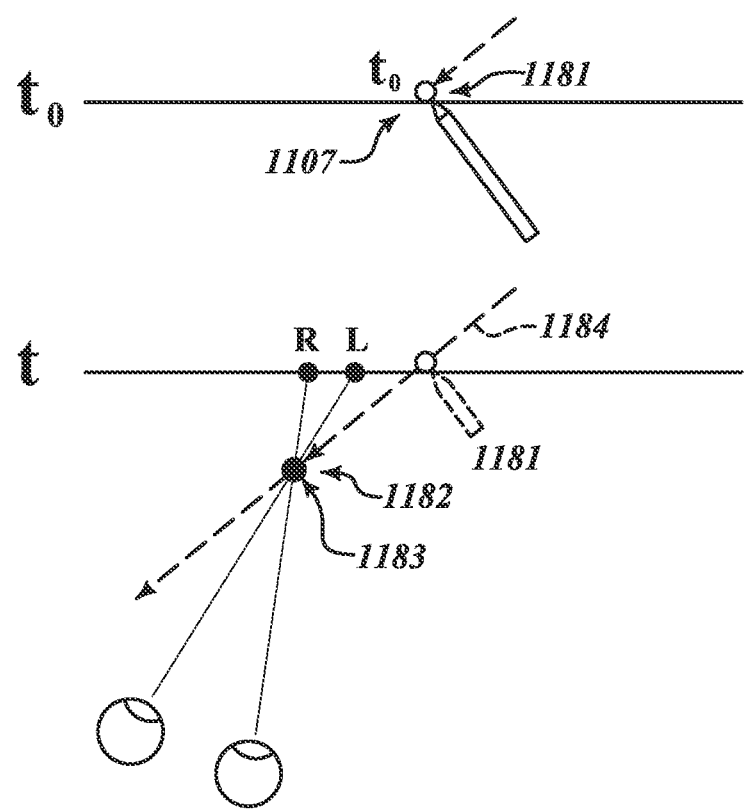
FIG. 11 illustrates a diagram of an example of a "3D marking"

FIG. 11 illustrates a diagram of an example of a "3D marking". In the example of a 3D marking shown in FIG. 11, at time $t_0$ a ball (1181) is marked (determined to be touched and painted) with mark 1107 when the ball is perceived to be at the screen's location (at zero z depth, or at zero stereoscopic disparity). At time $t_1$ ball 1181 has continued where the ball's image is now perceived in front of the screen (with negative (reversed) stereoscopic disparity between the right and left eye images), where 1182 is the perceived stereoscopic image, and 1183 is the mark on the ball in the perceived stereoscopic image, and the 3D trajectory of ball 1181 is indicated as 1184.

Some embodiments of system 600 may be employed as a secure system for the distributing and sharing highly sensitive information, with access control based on optically encoded encryption patterns.

Some embodiments may employ a natural signature system with natural inked signature aspects, with the addition of the ability to capture the exact motion and timing: a system that can verify the uniquely personal identity of style, velocity, acceleration and deceleration of a personal signature. Unlike the current hard surface pen signature devices found in retail locations, this system mimics exactly the feel (haptic feedback) of a natural pen, because it is a natural pen that one is writing with.

Some embodiments may employ special virtual secure paper: a paper-like surface material (thin, flexible and light, with the ability to be stacked in a sheaf) that contains invisible unique codes, which can be used to "unlock" and decrypt the projected information.

In these embodiments, sensitive information is encrypted at the source with high-level encryption. Further, multiple keys may be required to decrypt the file after encryption. One key might be residing in the display device. In some embodiments, system 600 may be an accessory that connects to a smart phone. In some such embodiments, the smart phone itself does not decrypt the file. Instead, in these embodiments, the final decryption is restricted to a secure decryption engine integrated into the graphics (e.g., pixel mapping and other image transformation functions in the personal projection device).

The additional keys can be provided by information pre-encoded on the surface (such as large keys) which may themselves be encrypted) and, in some embodiments, using additional information such as signature and symbols entered by the user in "invisible ink."

In some embodiments, the user's view is highly restricted, e.g., through the use of a retro-reflective screen. The embedded codes might be further restricted to be only visible by the scanning system and only from a certain viewpoint. An observation angle restricted to 0.2 degrees is demonstrated as feasible at up to 2 m distance. The feedback photo sensor should be within this response cone of the screen.

Some embodiments of system 600 allow for certain information to be displayed only on one particular surface, and only for the eyes of one particular user.

In other embodiments, the system can enable a subset of users to view selected images or text based on their security classification or based on specific verifiable combination of their personal and device identity.

In some such embodiments, two viewers out of a group might be able see classified information on a large shared screen, while the same information is not accessible to others present, e.g., in a situation room. The two viewers may see the (exact) same view or variations of the same views (e.g., different perspectives on the same object, subsets/supersets, or multi-language labels), or wholly different views on the same screen.

Also, in some embodiments, sound can be restricted. Some embodiments may employ a specially prepared reflection surface that contains so-called holographic images than are scanned, e.g., by an IR laser, providing unique diffraction responses ("characteristic speckle"). In some embodiments, decryption and encryption keys are embedded as watermarks in the images and used to decrypt (or encrypt) audio as well as video information in real time, creating a highly secure communication link.

Some embodiments of system 600 and/or process 750 enable all of the convenience of paper, but with images and text restricted for the eyes of the user, with annotations and inputs also only seen by the user. In these embodiments, no trace is left on the display after its use. In this way, there is no paper trail to worry about. With sufficiently high levels of encryption, the information can travel over public channels and insecure devices without risk of exposure.

Figure 12:
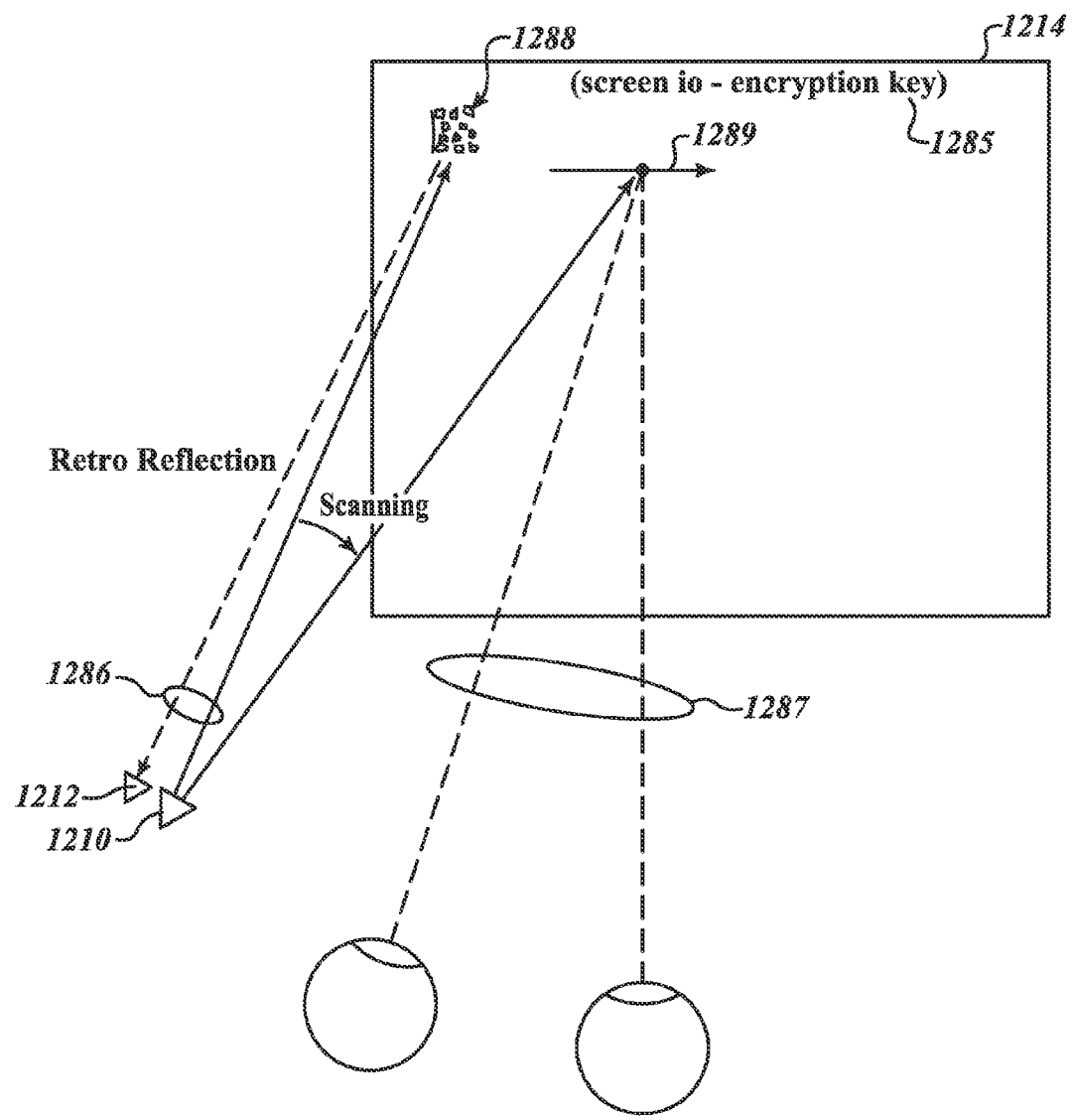
FIG. 12 shows a diagram of a surface with invisible codes and screen markings which enable access, unlocking, and decryption of an encrypted image being displayed on a special "secure" screen.

FIG. 12 shows a diagram of surface 1214 with invisible codes 1288 and screen markings which enable access, unlocking, and decryption of an encrypted image being displayed on a special "secure" screen 1214. In some embodiments, the encrypted image can only be decrypted on the one surface 1214 that includes the specific invisible code 1288 for decrypting the image. The decryption is local to the headset itself only in some embodiments. The image can be decrypted such that nothing else in the signal chain can see the invisible code 1288. A projected scanning beam emanates from a near-the-eye projector 1210. A reflection feedback detector 1212 is placed very close to the scanning mirror center of projector 1210.

The encryption key 1285 on the screen 1214 is an embedded pattern (e.g., with IR-absorbent dye in some embodiments) within an optical structure (e.g. reflective, holographic, refractive, or diffractive structure) as part of a retro-reflective surface element with a very narrowly restricted observation angle 1286 (e.g., less than 0.5 degrees in some embodiments). Accordingly, the reflected signal with the code 1288 and/or ID can be observed only in close vicinity to projector mirror 1210. In other parts of screen 1214 and for visible primaries screen, 1214 has a wider retro-reflective observation angle response 1287 or a more lambertian type diffusive response. This ensures that projected images are viewable at the position of at least one of the eyes (or both).

In some embodiments, access then requires up to four levels of confirmed identity: (1) a secure unique device ID, (2) a uniquely encoded surface, (3) an additional code or key known only by the recipient, and (4) a biometric authentication or signature.

The additional privacy, including codes in the screen, for your-eyes-only documents that can be decrypted on arrival and marked up, captured, and re-encrypted with very high levels of security, could serve as a useful tool those carry sensitive work in public places, while using paper-free documents that are reviewable but with feel and convenience of paper, while leaving no trace.

Inkless Embodiments

While the foregoing discussion has centered around embodiments that employing (invisible, vanish) ink (or solvent), other embodiments may employ similar functions but without ink.

For example, one embodiment may employ use of a pen that emits light as a location beacon. In this embodiment, the pen indicates touch by changing the emission pattern. The pen may turn on a glowing tip when the surface is contacted (mechanically sense it, or by other means of detection, or even derive power from the display surface itself). For example, high-frequency surface waves (ultrasonic, electromagnetic waves etc) either provide power to a laser or LED source in the pen which illuminates the tip or fibers (bristles), or the signal or mechanical contact actuates a switch.

In other embodiments, the light may be on, both before and during the touch, but the touching of the surface results in a change of signaling that is detected through optical or other (electromagnetic) feedback with a detection cycle, which in some embodiments may be the same as described previously when invisible ink is used as the means to detect.

In some embodiments, the pressure of touch can be detected and provided by changing the emission pattern, by higher or lower frequency pulsing, or by changing the intensity (pulse height) or duty cycle of the pulse modulation proportional to pressure of the pen tip against the surface, e.g., with a retractable stylus tip with a pressure sensor connected to that tip.

Rather than employing a pen that emits light as a beacon, other embodiments employ a sensor pen that detects light at the surface, e.g., the pixel location can be inferred from the known scan spatio-temporal pattern in the modulation, or from the modulation pattern or fiducial image embedded within the image itself, the latter being a form of structured light pattern, e.g., by timing the scan beam trajectory (tracking or image) pattern in a scanned display. Some embodiments may detect and "time stamp" the precise (nanosecond accurate) moment the scanning beam is observed (or at multiple points in the vicinity of the stylus position), and then infer screen position by referencing the scan pattern as a time function with period and/or phase, or by looking up the actual, possibly "pseudo random" pattern recorded by the projection system's optical feedback sensor.

Figure 13:
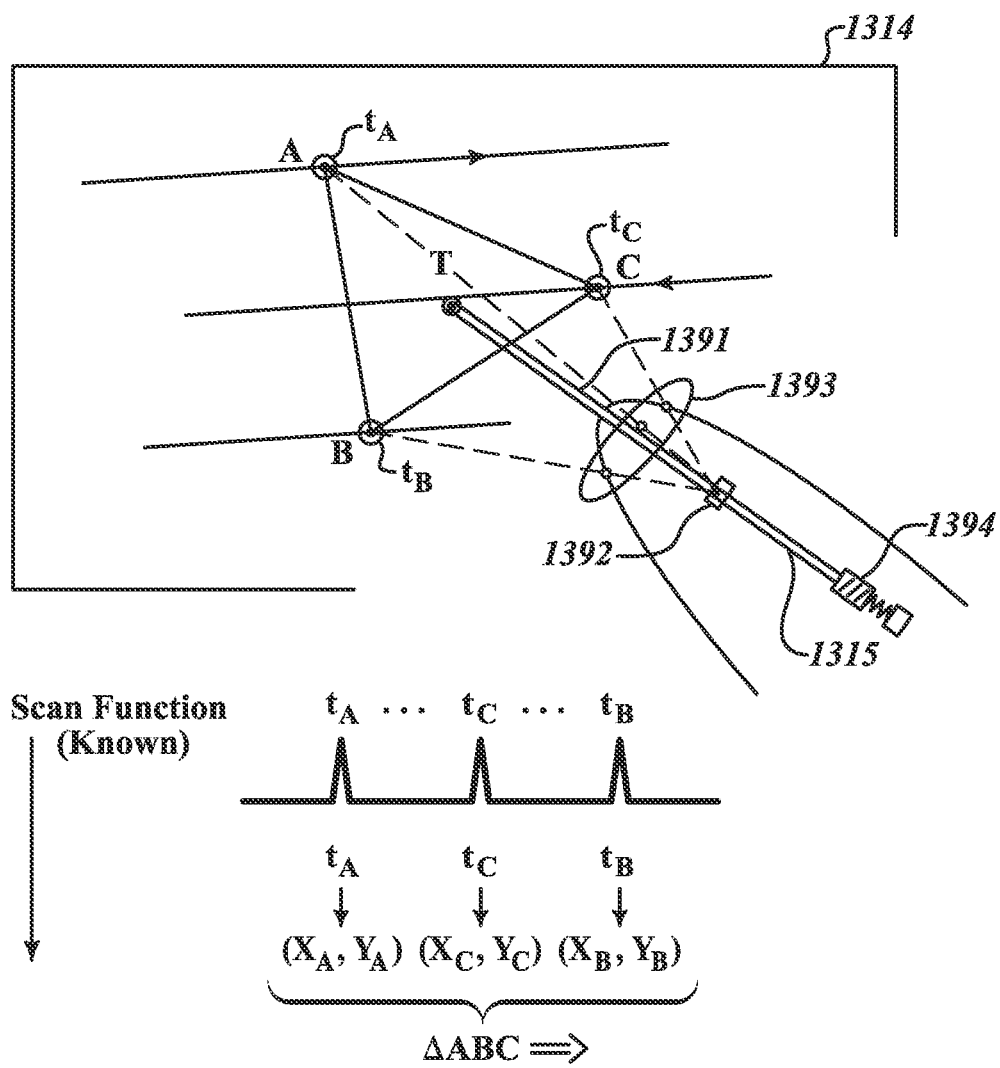
FIG. 13 illustrates an embodiment of a surface and a light-and-track pen, arranged in accordance with aspects of the invention.

Still other embodiments may employ a "light track and touch pen", as illustrated in FIG. 13. FIG. 13 illustrates an embodiment of screen 1314 and pen 1315, where pen 1315 includes pen body 1392, pressure sensor 1394, retractable stylus tip 1391, and an ability to observe 3 points (A, B, and C) around the stylus 1391 on screen 1314. The 3 points A, B and C observed on screen 1314 are in fixed "lines of sight" positions 1393 (like 3 targets viewed through 3 separate miniature telescopic gun sights). These lines-of-sight detector directions are angularly offset from the main directional orientation of the stylus (formed by retractable tip 1391, typically in the cylindrical center axis, surrounded by round pen body 1392). Arranged around pen tip 1391, these lines of sight detectors observe the exact moments of the transition of the scanning projector's beam as it crosses the 3 points A, B and C on the screen, at times $t_A$, $t_B$, and $t_C$ respectively. Because the projection display beam scanning pattern is known, the position of the 3 points A, B and C on the screen can be deducted strictly from the observed transition times of the scanning projector beam. From the positions of the 3 points (A, B, and C), the exact position and orientation (e.g. inclination and pointing direction) of the pen 1315 with respect to the screen surface 1314 (and the projected image) can be computed by solving the so-called 3-Point Perspective Pose Problem.

Retractable stylus 1315 both provides haptic feedback to the writer, and senses pressure via a retractable movable tip 1391 with a built-in pressure sensor 1394.

In other embodiments, pen 1314 may project 3 light points around the tip with similar triangular projection geometry. A camera mounted near the eye (e.g., on glasses or head gear) detects these 3 points and the triangular pattern they form on screen 1314. From distortion of this pattern the exact orientation and position of pen 1315 can be deducted. Also, the projected light points can signal the actual touching and pressure of stylus tip 1391 (e.g., by modulation methods described previously). The camera can observe this modulation, and accordingly, no separate feedback channel is required.

To perform position sensing, the position sensing device(s) is/are arranged to have a clear view of the remote surface. Three positions on the surface are observed. The observation is achieved by a telescopic view (aka gun sight) arrangement allowing the light from each of the observed positions to be projected onto a light sensor only when there is precise linear alignment between the sensor and any one of the positions observed on the surface.

The remote surface is a sufficiently diffuse optical reflector (diffusely reflecting at least one of the wavelengths of the projector's beams) so that the reflected light can be observed by Position Sensing Device(s) (PSD) over a wide range of observation angles. When a position on the remote surface is illuminated, at moment in time t, for a time interval delta t ($\Delta_t$), and if that momentarily illuminated surface position happens to be aligned with one of the PSD's lines-of-sight, then the PSD's sensor will receive some of the light reflecting off the surface from that location. This spatial filter may be an optical mask with small apertures, "pinholes". The spatial filter is arranged to spatially modulate (selectively block or let through) the light entering in the position sensing device.

The Position Sensing Device records the exact transition times for the three separate surface positions it is aligned with during a single scan period. Using the scan pattern's map as a reference, the spatial coordinates of 3 positions on the surface are then determined from the observed transition times (e.g. by a look-up table or a geometric algorithm). The Position Sensing Device has 3 fixed observation angles between the 3 lines of observation from a common observation point O (the observation perspective) towards the 3 surface positions A, B & C (lines OA, OB & OC). The position of the observation point O can then be determined by solving the so-called 3 point perspective pose problem or "P3P" problem (first solved by J. A. Grunert in Germany in 1841). These observation angles are determined by the construction of the observing device (the geometry of alignment between the sensor(s) and each of the apertures in the observing device).

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method for using an optical pen, comprising:
when a tip of a stylus is in contact with a location of an image on a surface, employing three or more line of sight light detectors on the optical pen to separately detect reflected light from three points around the location, wherein the three or more line of sight light detectors are positioned at angular locations offset along the directional orientation of the stylus formed by the tip, and wherein the detected reflected light is provided by one or more remotely located light sources that are separate from the optical pen;
employing the detected lights from line of sight detectors to determine a position and an orientation of the tip of the stylus and the location on the surface;
storing information for the position, orientation and location; and
modifying the image based on the stored information.

2. The method of claim 1, further comprising employing an amount of pressure on the tip in contact with the surface to determine when to detect light at the location.

3. The method of claim 1, wherein the three or more line of sight light detectors employ spatial filtering to determine the information.

4. The method of claim 1, further comprising employing one or more line of sight light sources on the stylus to project light onto the location on the surface, wherein the projected light is reflected by the location for detection by the light detectors.

5. The method of claim 1, further comprising:
employing the line of sight light detectors to detect light emitted from the location on the surface towards the stylus when the tip is in contact with the surface; and
employing one or more patterns in the detected light to determine the location on the surface where the tip of the stylus is in contact.

6. The method of claim 1, further comprising providing haptic feedback to the stylus based at least on pressure applied to the tip.

7. The method of claim 1, further comprising employing a remote light source that is arranged to project the image onto the surface.

8. An optical pen for editing an image, comprising:
a stylus, further comprising:
three or more line of sight light detectors arranged around a tip, wherein the tip is arranged to touch the image on a surface; and
a hardware processor that is arranged to performs actions, including:
when a tip of a stylus is in contact with a location of an image on a surface, employing the three or more line of sight light detectors on the optical pen to separately detect reflected light from three points around the location, wherein the three or more line of sight light detectors are positioned at angular locations offset along the directional orientation of the stylus formed by the tip, and wherein the detected reflected light is provided by one or more remotely located light sources that are separate from the optical pen;
employing the detected lights from line of sight detectors to determine a position and an orientation of the tip of the stylus and the location on the surface;
storing information in the hardware memory for the position, orientation and location of the stylus tip; and
modifying the image based on the stored information.

9. The apparatus of claim 8, further comprising employing an amount of pressure on the tip in contact with the surface to determine when to detect light at the location.

10. The apparatus of claim 8, wherein the three or more line of sight light detectors employ spatial filtering to determine the information.

11. The apparatus of claim 8, further comprising one or more light sources on the stylus, wherein the light sources project light onto the location on the surface, and wherein the projected light is reflected by the location for detection by the three or more line of sight light detectors.

12. The apparatus of claim 8, further comprising:
employing the three or more line of sight light detectors to detect light emitted from the location on the surface towards the stylus when the tip is in contact with the surface; and
employing one or more patterns in the detected light to determine the location on the surface where the tip of the stylus is in contact.

13. The apparatus of claim 8, further comprising providing haptic feedback to the stylus based at least on pressure applied to the tip.

14. The apparatus of claim 8, further comprising a remote light source that is arranged to project the image onto the surface.

15. A processor-readable non-transitive storage media that is operative to store data and instructions, which, when executed by one or more processors, enables actions with an optical pen, comprising:
when a tip of a stylus is in contact with a location of an image on a surface, employing three or more line of sight light detectors on the optical pen to separately detect reflected light from three points around the location, wherein the three or more line of sight light detectors are positioned at angular locations offset along the directional orientation of the stylus formed by the tip;
employing the detected lights from line of sight detectors to determine a position and an orientation of the tip of the stylus and the location on the surface;
storing information for the position, orientation and location; and
modifying the image based on the stored information.

16. The media of claim 15, further comprising employing one or more light sources on the stylus to project light onto the location on the surface, wherein the projected light is reflected by the location for detection by the three or more line of sight light detectors.

17. The media of claim 15, further comprising:
employing the three or more line of sight light detectors to detect light emitted from the location on the surface towards the stylus when the tip is in contact with the surface; and
employing one or more patterns in the detected light to determine the location on the surface where the tip of the stylus is in contact.

18. The media of claim 15, further comprising employing a remote light source that is arranged to project the image onto the surface.

* * * * *

UNITED STATES PATENT AND TRADEMARK OFFICE
CERTIFICATE OF CORRECTION

PATENT NO. : 9,501,176 B1
APPLICATION NO. : 14/636062
DATED : November 22, 2016
INVENTOR(S) : Smits It is certified that error appears in the above-identified patent and that said Letters Patent is hereby corrected as shown below:

On the Title Page

In Item (56), under "OTHER PUBLICATIONS", in Column 2, Line 1, delete "Valv's" and insert -- Valve's --, therefor.

On Page 3, in Item (56), under "OTHER PUBLICATIONS", in Column 2, Line 7, delete "for Application" and insert -- for --, therefor.

In the Drawings

In Fig. 11, Sheet 11 of 13, delete "t" and insert -- $t_1$ --, therefor.

In the Specification

In Column 2, Line 12, delete "embodiment" and insert -- embodiment of --, therefor.

In Column 5, Line 7, delete "ink 114" and insert -- ink 107 --, therefor.

In Column 5, Line 8, delete "the a" and insert -- a --, therefor.

In Column 5, Lines 35-36, delete "to performed" and insert -- to perform --, therefor.

In Column 5, Line 62, delete "pre" and insert -- per --, therefor.

In Column 8, Line 39, delete "embodiment" and insert -- embodiment of --, therefor.

In Column 8, Line 41, delete "t0," and insert -- $t_0$, --, therefor.

In Column 10, Line 61, delete "PSTP 600" and insert -- PSTP system 600 --, therefor.

Signed and Sealed this
Ninth Day of October, 2018

Andrei Iancu
*Director of the United States Patent and Trademark Office*

CERTIFICATE OF CORRECTION (continued)
U.S. Pat. No. 9,501,176 B1

In Column 13, Line 24, delete "processor 618" and insert -- processor 616 --, therefor.

In Column 16, Line 65, delete "image" and insert -- image. --, therefor.

In Column 17, Line 53, delete "encrypted)" and insert -- encrypted --, therefor.

In Column 19, Line 54, delete "stylus 1391" and insert -- stylus tip 1391 --, therefor.

In the Claims

In Column 21, Line 49, in Claim 8, delete "to performs" and insert -- to perform --, therefor.

In Column 22, Line 6, in Claim 9, delete "The apparatus" and insert -- The optical pen --, therefor.

In Column 22, Line 9, in Claim 10, delete "The apparatus" and insert -- The optical pen --, therefor.

In Column 22, Line 11, in Claim 11, delete "The apparatus" and insert -- The optical pen --, therefor.

In Column 22, Line 16, in Claim 12, delete "The apparatus" and insert -- The optical pen --, therefor.

In Column 22, Line 24, in Claim 13, delete "The apparatus" and insert -- The optical pen --, therefor.

In Column 22, Line 27, in Claim 14, delete "The apparatus" and insert -- The optical pen --, therefor.

In Column 22, Line 48, in Claim 16, delete "The media" and insert -- The processor-readable non-transitive storage media --, therefor.

In Column 22, Line 53, in Claim 17, delete "The media" and insert -- The processor-readable non-transitive storage media --, therefor.

In Column 22, Line 61, in Claim 18, delete "The media" and insert -- The processor-readable non-transitive storage media --, therefor.